United States Patent
Kim et al.

(10) Patent No.: US 8,901,564 B2
(45) Date of Patent: Dec. 2, 2014

(54) ARRAY SUBSTRATE AND METHOD OF MANUFACTURING THE SAME

(75) Inventors: Jang-Il Kim, Chungcheongnam-do (KR); Jae-Jin Song, Gyeonggi-do (KR); Sung-Hee Hong, Gyeonggi-do (KR); Hyuk-Jin Kim, Chungcheongnam-do (KR); Kee-Bum Park, Chungcheongnam-do (KR); Byoung-Sun Na, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 33 days.

(21) Appl. No.: 13/553,090

(22) Filed: Jul. 19, 2012

(65) Prior Publication Data

US 2013/0087793 A1    Apr. 11, 2013

(30) Foreign Application Priority Data

Oct. 7, 2011    (KR) .............. 2011-0102515

(51) Int. Cl.
*H01L 29/10*    (2006.01)
*G02F 1/1345*    (2006.01)
*G09G 3/36*    (2006.01)

(52) U.S. Cl.
CPC .......... *G02F 1/13458* (2013.01); *G09G 3/3648* (2013.01); *G09G 2300/0408* (2013.01); *G09G 3/3677* (2013.01); *G09G 2310/0286* (2013.01)
USPC .......................................... 257/59

(58) Field of Classification Search
USPC .......................................... 257/59
See application file for complete search history.

(56) References Cited

U.S. PATENT DOCUMENTS

| 6,031,512 | A | 2/2000 | Kadota et al. | |
|---|---|---|---|---|
| 6,091,466 | A * | 7/2000 | Kim et al. | 349/43 |
| 2010/0148176 | A1 | 6/2010 | Son et al. | |
| 2011/0032445 | A1* | 2/2011 | Kim et al. | 349/43 |
| 2013/0161624 | A1* | 6/2013 | Lee et al. | 257/59 |

FOREIGN PATENT DOCUMENTS

| KR | 1020060013885 A | 2/2006 |
|---|---|---|
| KR | 10-0580398 | 5/2006 |

* cited by examiner

*Primary Examiner* — Shaun Campbell
(74) *Attorney, Agent, or Firm* — F. Chau & Associates, LLC

(57) ABSTRACT

An array substrate includes a base substrate and a contact part. The contact part is disposed on the base substrate. The contact part includes a first metal pattern, a disconnection control pattern and a connecting pattern. The second metal pattern is disposed on a layer different from the first metal pattern, the disconnection control pattern overlaps a side surface of the second metal pattern and a connecting pattern is formed on the first and second metal patterns and the disconnection control pattern and connects the first metal pattern with the second metal pattern.

11 Claims, 14 Drawing Sheets

ARRAY SUBSTRATE AND METHOD OF MANUFACTURING THE SAME

CROSS-REFERENCE TO RELATED APPLICATION

This application claims priority under 35 U.S.C. §119 to Korean Patent Application No. 10-2011-0102515, filed on Oct. 7, 2011 in the Korean Intellectual Property Office (KIPO), the contents of which are incorporated by reference herein in its entirety.

TECHNICAL FIELD

Exemplary embodiments of the present invention relate to an array substrate and a method of manufacturing the array substrate. More particularly, exemplary embodiments of the present invention relate to an array substrate used for a display apparatus and a method of manufacturing the array substrate.

DISCUSSION OF THE RELATED ART

Generally, a display apparatus includes a display panel, a gate driving part and a data driving part. The display panel includes an array substrate and an opposite substrate facing the array substrate.

The array substrate includes a display area in which a pixel part is formed and a peripheral area surrounding the display area.

The gate driving part and the data driving part are disposed in the peripheral area, and are electrically connected to gate lines and data lines, respectively, on the array substrate. The gate driving part provides gate signals to the gate lines, and the data driving part provides data signals to the data lines.

The gate driving part is directly mounted on the array substrate.

A gate signal outputted from a drain electrode of a circuit transistor in the gate driving part is provided to a corresponding gate line. The drain electrode of the circuit transistor is connected to the gate line by a connecting electrode in the peripheral area.

However, an active pattern under the drain electrode is etched further than the drain electrode, so that an under-cut may occur between the active pattern and the drain electrode. The connecting electrode connecting the drain electrode of the circuit transistor with the gate electrode may be disconnected due to the under-cut.

When a data pattern overlapping part of a gate pattern is connected to the gate pattern using a connecting electrode, an insulating layer under the data pattern is etched further than the data pattern, so that an under-cut may occur between the data pattern and the insulating layer. As a consequence, the connecting electrode may be disconnected.

SUMMARY

Exemplary embodiments of the present invention provide an array substrate that can improve the reliability of a display apparatus and a method of manufacturing the array substrate.

According to an exemplary embodiment of the present invention, an array substrate includes a base substrate and a contact part. The contact part is disposed on the base substrate. The contact part includes a first metal pattern, a second metal pattern, a disconnection control pattern and a connecting pattern. The second metal pattern is disposed on a layer different from the first metal pattern, the disconnection control pattern overlaps a side surface of the second metal pattern and the connecting pattern is formed on the first and second metal patterns and the disconnection control pattern and connects the first metal pattern with the second metal pattern.

In an exemplary embodiment, the array substrate further includes a first insulating layer and an active pattern. The first insulating layer is disposed on the base substrate to cover the first metal pattern. The active pattern is disposed under the second metal pattern. The second metal pattern and the active pattern are spaced apart from the first metal pattern. The disconnection control pattern overlaps an upper surface and a side surface of the second metal pattern.

In an exemplary embodiment, the array substrate further includes a second insulating layer disposed on the base substrate. The second insulating layer covers the second metal pattern. The disconnection control pattern is disposed on the second insulating layer overlapping an upper surface and a side surface of the second metal pattern.

In an exemplary embodiment, the base substrate includes a display area and a peripheral area surrounding the display area. The array substrate further includes a pixel electrode disposed in the display area.

In an exemplary embodiment, the array substrate further includes a color filter pattern overlapping the pixel electrode. The disconnection control pattern includes a material the same or substantially the same as the color filter pattern.

In an exemplary embodiment, the array substrate further includes a color filter pattern and a light blocking pattern. The color filter pattern overlaps the pixel electrode. The light blocking pattern is disposed between color filter patterns adjacent to each other. The disconnection control pattern includes a material the same or substantially the same as the light blocking pattern.

In an exemplary embodiment, the array substrate further includes an organic film disposed under the pixel electrode. The disconnection control pattern includes a material the same or substantially the same as the organic film.

In an exemplary embodiment, the array substrate includes a circuit transistor mounted on the peripheral area. The contact part is disposed in the peripheral area. The second metal pattern extends from a drain electrode of the circuit transistor and outputs a gate signal provided from the drain electrode. The first metal pattern extends from a gate line connected to the pixel electrode and receives the gate signal via the second metal pattern and the connecting electrode.

In an exemplary embodiment, the array substrate further includes a data line and a fan-out line. The data line is connected to the pixel electrode and disposed in the display area. The fan-out line receives a data signal provided from an external device and disposed in the peripheral area. The contact part is disposed in the peripheral area. The first metal pattern extends from the fan-out line and output the data signal. The second metal pattern extends from the data line and receives the data signal via the first metal pattern and the connecting electrode.

In an exemplary embodiment, the base substrate includes a display area and a peripheral area surrounding the display area. The array substrate further includes a gate line, a storage line, first, second and third pixel transistors, a first pixel electrode and a second pixel electrode. The gate line extends in a first direction in the display area. The storage line is spaced apart from the gate line. The first, second and third pixel transistors are connected to the gate line. The first pixel electrode is connected to the first pixel transistor. The second pixel electrode is connected to the second and third pixel transistors. The first metal pattern extends from the storage line. The second metal pattern is connected to one of the second and third pixel transistors.

In an exemplary embodiment, the disconnection control pattern overlaps an edge of an upper surface of the first metal pattern.

In an exemplary embodiment, the array substrate further includes a first insulating layer disposed on the base substrate. The first insulating layer covers the first metal pattern. A side surface of the first insulating layer is exposed through a contact hole through which the first and second metal patterns are exposed. The second metal pattern overlaps part of the first metal pattern. The disconnection control pattern overlaps an upper surface and a side surface of the second metal pattern overlapping part of the first metal pattern and overlaps a side surface of the first insulating layer.

In an exemplary embodiment, the array substrate further includes an active pattern disposed under the second metal pattern. A side surface of the active pattern is exposed through a contact hole through which the first and second metal patterns are exposed. The disconnection control pattern further overlaps a side surface of the active pattern.

According to an exemplary embodiment of the present invention, a method of manufacturing an array substrate is provided. In the method, a first metal pattern is formed on a base substrate. A first insulating layer is formed on the base substrate on which the first metal pattern is formed. A second metal pattern is formed on the first insulating layer. A disconnection control pattern is formed to overlap a side surface of the second metal pattern. A connecting pattern extending on the first and second metal patterns and the disconnection control pattern is formed to connect the first metal pattern with the second metal pattern.

In an exemplary embodiment, when the first metal pattern is formed, a gate metal layer is formed on the base substrate. The gate metal layer is patterned to form a gate line and a pixel gate electrode of a pixel transistor extending from the gate line in a display area of the base substrate, and to form a circuit gate electrode of a circuit transistor and the first metal pattern connected to the gate line in a peripheral area surrounding the display area. In the method, an active layer and a data metal layer are sequentially formed on the first insulating layer.

In an exemplary embodiment, when the second metal pattern is formed, the active layer and the data layer are patterned to form a data line crossing the gate line and pixel source and drain electrodes of the pixel transistor in the display area, to form circuit source and drain electrodes of the circuit pixel transistor in the peripheral area, to form a second metal pattern connected to the circuit drain electrode and spaced apart from the first metal pattern in the peripheral area, and to form an active pattern under the data line, the pixel source and drain electrodes, the circuit source and drain electrodes and the second metal pattern in the peripheral area.

In an exemplary embodiment, when the disconnection control pattern is formed, a color filter layer is formed on the base substrate on which the second metal pattern is formed. The color filter layer is patterned to form a color filter pattern in display area of the base substrate and to form the disconnection control pattern overlapping a side surface of the second metal pattern in the peripheral area of the base substrate.

In an exemplary embodiment, when the disconnection control pattern is formed, a light blocking layer is formed on the base substrate on which the second metal pattern is formed. The light blocking layer is patterned to form a light blocking pattern overlapping the gate line and the data line in the display area of the base substrate and to form a first disconnection control pattern overlapping a side surface of the second metal pattern in the peripheral area of the base substrate.

In an exemplary embodiment, when the first metal pattern is formed, a gate metal layer is formed on the base substrate. The gate metal layer is patterned to form a gate line and a pixel gate electrode extending from the gate line in a display area of the base substrate, and to form a fan-out line receiving a data signal from an external device and the first metal pattern extending from the fan-out line in a peripheral area surrounding the display area. In the method, an active layer and a data metal layer are sequentially formed on the first insulating layer.

In an exemplary embodiment, when the second metal pattern is formed, the active layer and the data metal layer are patterned to form a data line crossing the gate line and pixel source and drain electrodes of the pixel transistor in the display area of the base substrate, to form a second metal pattern extending from the data line and spaced apart from the first metal pattern in the peripheral area, and to form an active pattern under the data line, the pixel source and drain electrodes and the second metal pattern in the peripheral area.

In an exemplary embodiment, when the disconnection control pattern is formed, a color filter layer is formed in the base substrate on which the second metal pattern is formed. The color filter layer is patterned to form a color filter pattern in the display area of the base substrate and to form the disconnection control pattern overlapping a side surface of the second metal pattern in the peripheral area of the base substrate.

In an exemplary embodiment, when the first metal pattern is formed, a gate metal layer is formed on the base substrate. The gate metal layer is pattered to form a gate line, a pixel gate electrode of a pixel transistor extending from the gate line, a storage line spaced apart from the gate line, and the first metal pattern extending from the storage line in a display area of the base substrate. In the method, an active pattern is further formed on the first insulating layer.

In an exemplary embodiment, when the second metal pattern is formed, a data line crossing the gate line, pixel source and drain electrodes of the pixel transistor, and the second metal pattern extending from the pixel source electrode and overlapping the first metal pattern in the display area of the base substrate are formed.

In an exemplary embodiment, when the disconnection control pattern is formed, a color filter layer is formed on the base substrate on which the second metal pattern is formed. The color filter layer is patterned to form a color filter pattern in the display area of the base substrate and to form the disconnection control pattern overlapping an upper surface and a side surface of an end portion of the second metal pattern overlapping the first metal pattern.

According to an array substrate and a method of manufacturing the array substrate, a contact part includes a disconnection control pattern, so that a connecting pattern electrically connecting the data pattern with gate pattern may be prevented from being disconnected. Thus, the reliability of a display substrate may be improved.

When the display substrate includes a color filter pattern, the disconnection control pattern includes a material the same or substantially the same as the color filter pattern.

When the display substrate includes a light blocking pattern, the disconnection control pattern includes a material the same or substantially the same as the light blocking pattern.

When the display substrate includes an organic layer, the disconnection control pattern includes a material the same or substantially the same as the organic layer.

Thus, an under-cut due to an active pattern or a first insulating layer under the data pattern may be prevented from occurring without additional processes or costs.

A gate pattern of each of first, second and third contact parts overlaps a data pattern of each of the first, second and third contact parts, so that sizes of the first, second and third contact parts may be reduced.

Thus, a size of a peripheral area may be reduced, or an aperture ratio of a display area may increase.

BRIEF DESCRIPTION OF THE DRAWINGS

The embodiments of the present invention will become more apparent by reference to the accompanying drawings, in which.

DETAILED DESCRIPTION

Figure 1:
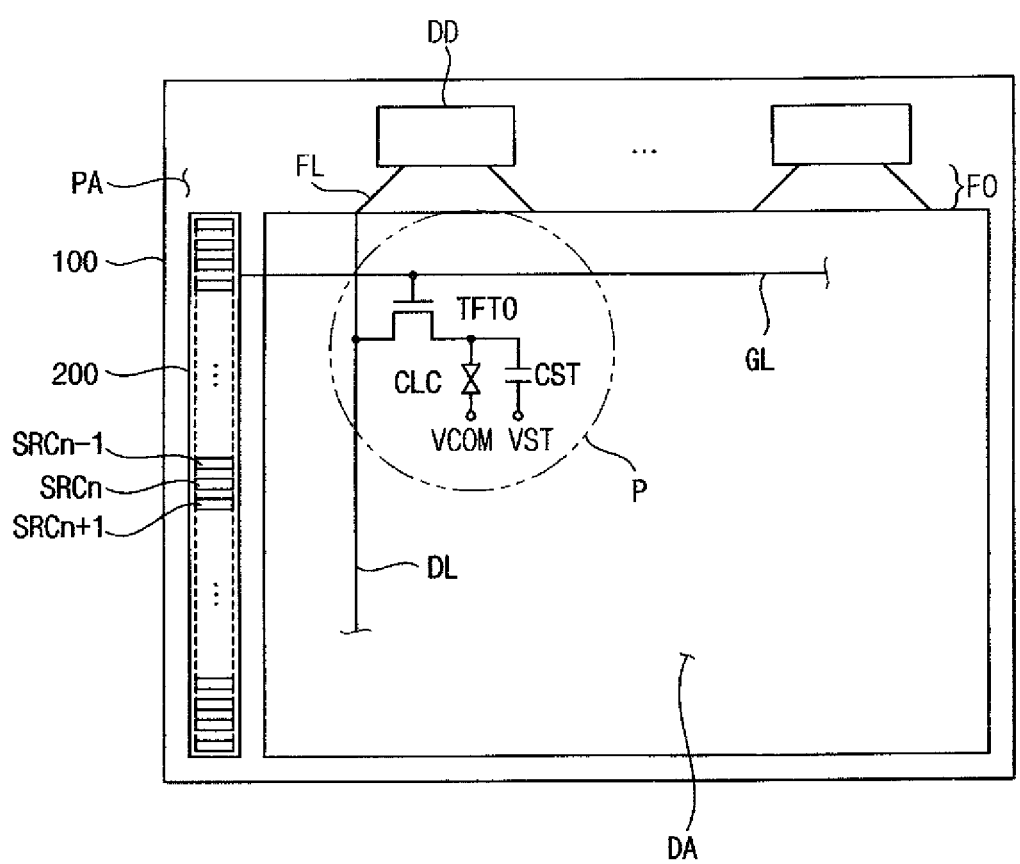
FIG. 1 is a plan view illustrating an array substrate according to an exemplary embodiment of the present invention.

Hereinafter, the embodiments of the present invention will be described in detail with reference to the accompanying drawings, wherein the same reference numerals may be used to denote the same or substantially the same elements throughout the specification and the drawings. The present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present.

As used herein, the singular forms, "a," "an" and "the" are intended to include the plural forms as well, unless the context clearly indicates otherwise.

FIG. 1 is a plan view illustrating an array substrate according to an exemplary embodiment of the present invention.

Referring to FIG. 1, a display panel includes an array substrate 100 and a data driving part DD.

Figure 4:
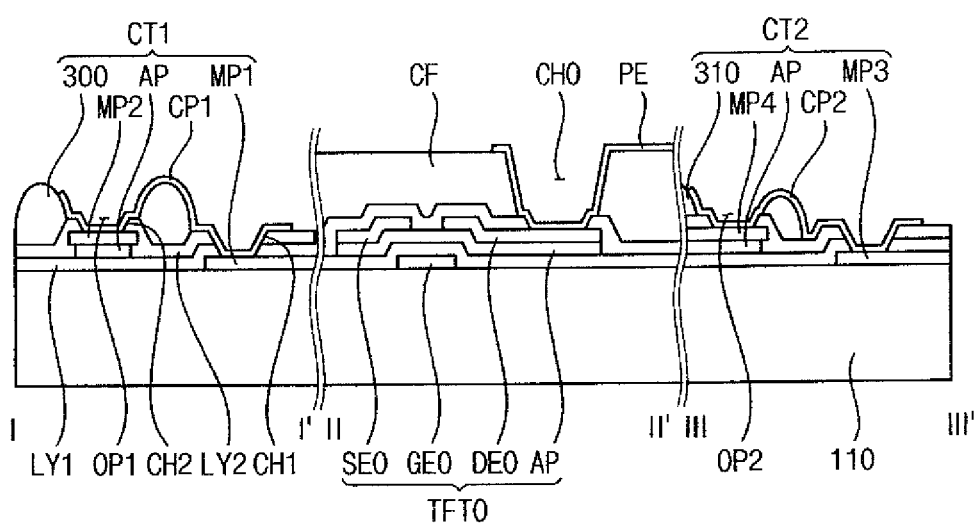
FIG. 4 is a cross-sectional view taken along a line I-I', a line II-II' and a line III-III' of FIG. 1.

The array substrate 100 includes a base substrate 110 (as shown in FIG. 4) including a display area DA and a peripheral area PA surrounding the display area DA. A pixel part P is formed in the display area DA, and a gate driving part 200 and a fan-out part FO are formed in the peripheral area PA.

The pixel part P includes a pixel transistor TFT0 electrically connected to a gate line GL and a data line DL, and capacitors CLS and CST electrically connected to the pixel transistor TFT0.

The gate driving part 200 includes a shift register outputting a gate signal to the gate line GL. The shift register includes a plurality of stages SRCn−1, SRCn, and SRCn+1 ('n' is a positive integer greater than 1). The gate driving part 200 is directly mounted in the peripheral area PA corresponding to an end of the gate line GL.

Alternatively, gate driving parts 200 may be directly mounted in the peripheral area PA corresponding to two opposite ends of the gate line GL.

The fan-out part FO includes a fan-out line FL through which a data signal is output to the data line DL. The fan-out line FL is formed between the data line DL and the data driving part DD, and provides the data signal outputted from the data driving part DD to the data line DL.

Figure 2:
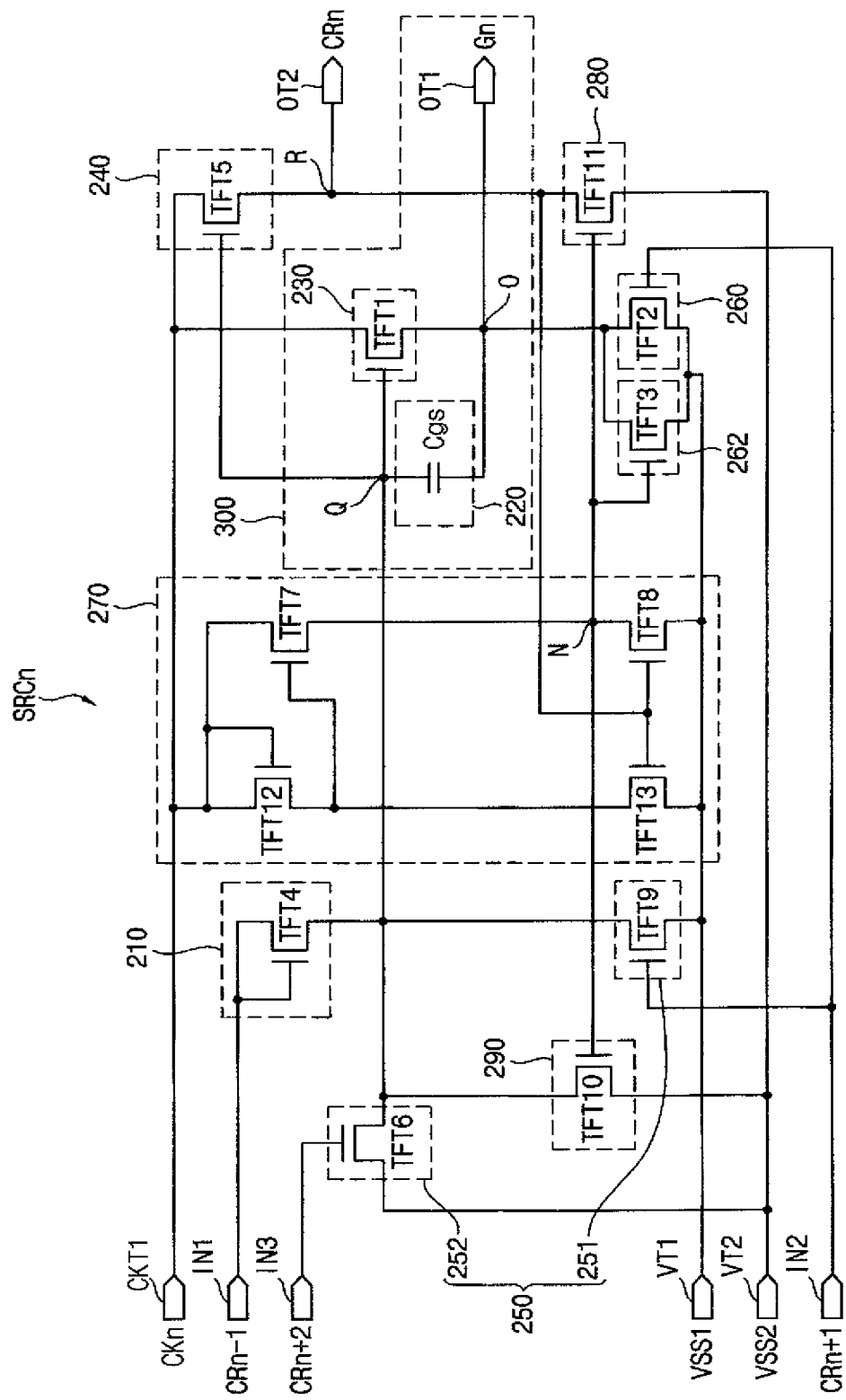
FIG. 2 is an equivalent circuit diagram illustrating a stage of the gate driving part of FIG. 1.

FIG. 2 is an equivalent circuit diagram illustrating a stage of the gate driving part of FIG. 1.

Referring to FIG. 1 and FIG. 2, the gate driving part 200 includes a shift register including a plurality of stages cascade-connected to each other.

An An-th stage SRCn includes a first clock terminal CT1, a first input terminal IN1, a second input terminal IN2, a third input terminal IN3, a first voltage terminal VT1, a second voltage terminal VT2, a first output terminal OT1 and a second output terminal OT2.

The n-th stage SRCn further includes a buffer part 210, a capacitor part 220, a pull-up part 230, a carry part 240, a discharge part 250, a pull-down part 260, a switching part 270, a first maintaining part 280, a second maintaining part 290 and a third maintaining part 262.

The buffer part 210 provides an (n−1)-th carry signal CRn−1 to the pull-up part 230. The buffer part 210 includes a fourth transistor TFT4.

The capacitor part 220 is charged with a voltage in response to the carry signal CRn−1 provided from the buffer part 210. The capacitor part 220 is disposed between a gate electrode of the pull-up part 230 and a source electrode of the pull-up part 230. The capacitor part 220 includes at least one capacitor Cgs.

When a high voltage of the carry signal CRn−1 is received to the buffer part 210, the capacitor part 220 is charged with a voltage corresponding to the high voltage.

The pull-up part 230 outputs a gate signal. The pull-up part 230 includes a first transistor TFT1. The first transistor TFT1 includes a gate electrode (hereinafter, also referred to as a "control electrode") connected to a node Q, a drain electrode (hereinafter, also referred to as an "input electrode") connected to the first clock terminal CT1 and a source electrode (hereinafter, also referred to as an "output electrode") connected to an output node O. The output node O is connected to the first output terminal OT1.

When the voltage charged in the capacitor part 220 is applied to the gate electrode of the pull-up part 230, the first clock terminal CT1 receives a high voltage of a clock signal CKn, so that the pull-up part 230 is bootstrapped. Then, the node Q connected to the gate electrode of the pull-up part 230 is boosted from the received voltage to a boosted voltage.

For example, the node Q has the received voltage in an (n−1)-th period, and has the boosted voltage in an n-th period.

During the n-th period when the boosted voltage is applied to the gate electrode of the pull-up part 230, the pull-up part 230 outputs the high voltage of the clock signal CKn as a high voltage of an n-th gate signal Gn. The n-th gate signal Gn is outputted via the first output terminal OT 1 connected to the output node O.

The pull-down part 260 pulls down a voltage of the output node O to a first low voltage VSS1 applied to the first voltage terminal VT1 when the (n+1)-th carry signal CRn+1 is received to the second input terminal IN2. The pull-down part 260 includes a second transistor TFT2.

The carry part 240 outputs a high voltage of the clock signal CKn received to the first clock terminal CT1 as an n-th carry signal CRn, when a high voltage is applied to the node Q. The n-th carry signal CRn is outputted via the second output terminal OT2 connected to a node R. The carry part 240 includes a fifth transistor TFT5.

The first maintaining part 280 maintains a voltage of the node R as a second low voltage VSS2 in response to a signal of the node N during a period except for an output period of the n-th carry signal CRn. The first maintaining part 280 includes an eleventh transistor TFT11.

The switching part 270 applies a signal having a phase the same or substantially same as the clock signal CKn received to the first clock terminal CKT1 to the node N during a period excepting for an output period of the n-th carry signal CRn. The switching part 270 includes a twelfth transistor TFT12, a seven transistor TFT7, a thirteen transistor TFT13 and an eighteen transistor TFT8.

The discharge part 250 discharges a high voltage of the node Q as the second low voltage VSS2 having a level lower than the first low voltage VSS1 in response to at least one carry signal of next stages. The discharge part 250 includes a first discharge part 251 including a ninth transistor TFT9 and a second discharge part 252 including a sixth transistor TFT6.

The first discharge part 251 discharges the voltage of the node Q as the first low voltage VSS1 applied to the first voltage terminal VT1 when the (n+1)-th carry signal (CRn+1) is applied to the second input terminal IN2.

The second discharge part 252 discharges the voltage of the node Q as the second low voltage VSS2 applied to the second voltage terminal VT2 when the (n+2)-th carry signal (CRn+2) is applied to the third input terminal 1N3.

The second maintaining part 290 maintains the voltage of the node Q as the second low voltage VSS2 in response to a signal of the node N during a predetermined period of a frame. The second maintaining part 290 includes a tenth transistor TFT10.

The third maintaining part 262 maintains the voltage of the output node O as the first low voltage VSS1 applied to the first voltage terminal VT1 in response to a signal of the node N during the predetermined period of the frame. The third maintaining part 262 includes a third transistor TFT3.

Although the n-th stage is described as an example, the exemplary embodiments of the present invention may be applicable to any gate drive circuit including the first transistor TFT1.

Figure 3:
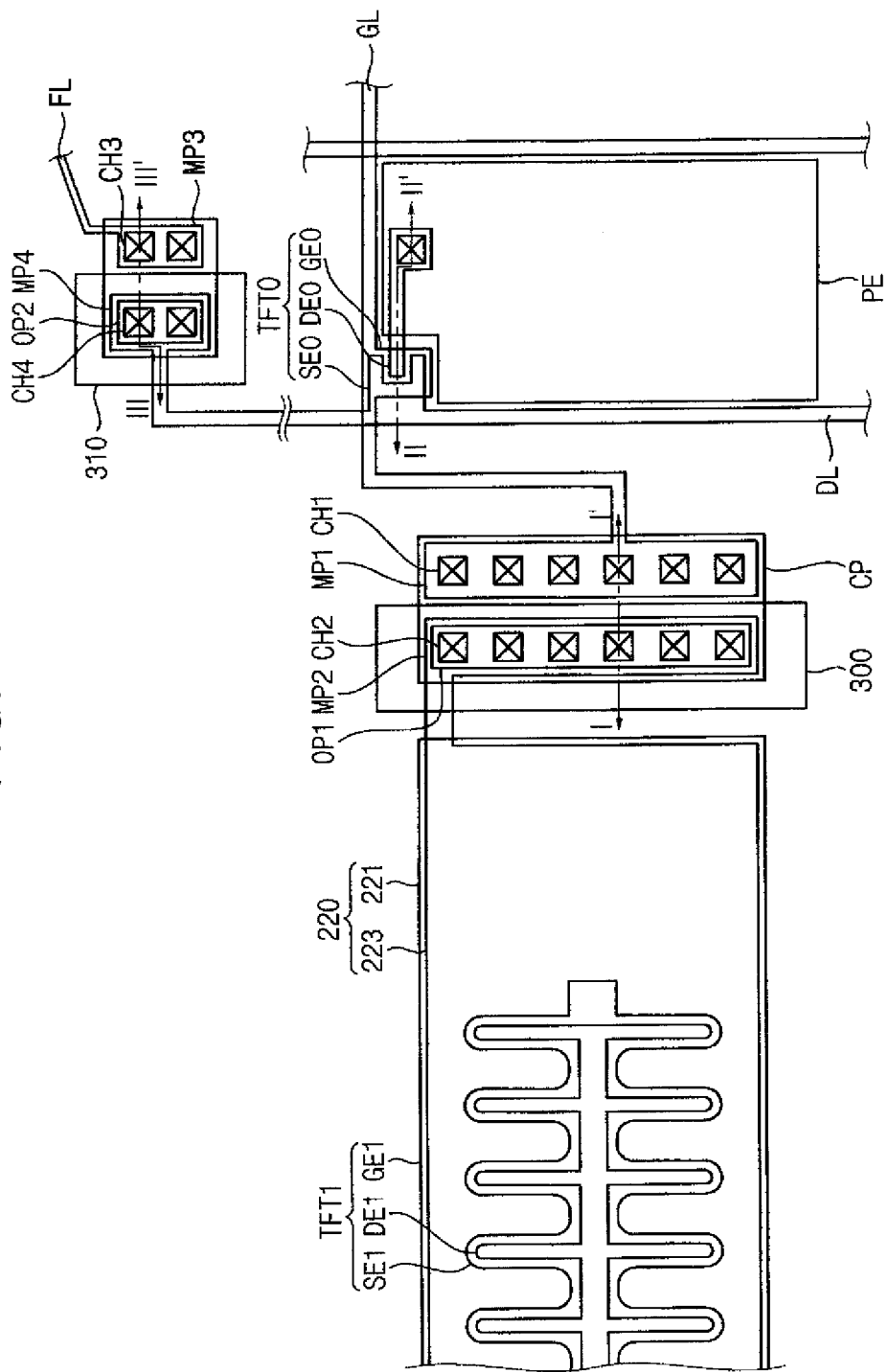
FIG. 3 is a plan view illustrating the gate driving part, pixel part, and fan-out part of FIG. 1.

FIG. 3 is a plan view illustrating the gate driving part, pixel part, and fan-out part of FIG. 1. FIG. 4 is a cross-sectional view taken along a line I-I' a line II-II' and a line III-III' of FIG. 1.

Referring to FIG. 3 and FIG. 4, the n-th stage of the gate driving part 200 formed in the peripheral area PA of the base substrate 110 includes a first transistor TFT1, a capacitor part 220 and a first contact part CT10.

The first transistor TFT1 includes a gate electrode GE1, a first insulating layer LY1, an active pattern AP, a source electrode SE1 and a drain electrode DE1. The gate electrode GE1 of the transistor TFT1 receives a high voltage of the clock signal CKn, and then outputs the gate signal Gn to the source electrode SE1 of the first transistor TFT1.

The gate electrode GE1 includes a gate metal, and the source electrode SE1 and the drain electrode DE1 include a data metal.

The active pattern AP includes a semiconductor pattern and an ohmic contact pattern. The semiconductor pattern includes amorphous silicon (a-Si), and the ohmic contact pattern includes n+ amorphous silicon (n+ a-Si).

The capacitor part 220 is formed between the first transistor TFT1 and the pixel part P.

The capacitor part 220 includes a first electrode 221 and a second electrode 223. According to an embodiment, the capacitor part 220 further includes a first insulating layer LY1 between the first electrode 221 and the second electrode 223.

The first electrode 221 includes a gate metal, and the second electrode 223 includes a data metal.

The first contact part CT10 transfers a gate signal outputted from the first source electrode SE1 of the first transistor TFT1 to the gate line GL. The first contact part CT1 includes a first metal pattern MP1, a second metal pattern MP2, the active pattern AP, a first connecting pattern CP1 and a first disconnection control pattern 300.

The first metal pattern MP1 extends from the gate line GL, and includes a gate metal. The second metal pattern MP2 extends from the first source electrode SE1 of the first transistor TFT1 and includes a data metal. The second metal pattern MP2 is spaced apart from the first metal pattern MP1.

The first connecting pattern CP1 electrically connects the first metal pattern MP1 with the second metal pattern MP2 via first and second contact holes CH1 and CH2. The first connecting pattern CP1 includes a transparent metal.

The active pattern AP extends from the first transistor TFT1 and is disposed under the second metal pattern MP2. The active pattern AP is etched further than the second metal pattern MP2 to remove a stringer in which the data metal remains except for the second metal pattern MP2, so that an under-cut may be formed between the active pattern AP and the second metal pattern MP2.

The first disconnection control pattern 300 is formed on the second metal pattern MP2 and covers an upper surface of the second metal pattern MP2 and a side surface of the second metal pattern MP2. According to an embodiment, the first disconnection control pattern 300 also covers a side surface of the active pattern AP.

The first disconnection control pattern 300 includes a material the same or substantially the same as the color filter pattern CF of the pixel part P. For example, according to an embodiment, the first disconnection control pattern 300 includes a material the same or substantially the same as a blue color filter pattern.

The first disconnection control pattern includes a first opening part OP1 exposing the second metal pattern MP2 through the second contact hole CH2. The first opening part OP1 has a width smaller than a width of the second metal pattern MP2.

The first disconnection control pattern 300 is disposed between the second metal electrode MP2 and the first connecting pattern CP1.

The first connecting pattern. CP1 may extend from the first metal pattern MP1 exposed through the first contact hole CH1 to the first disconnection control pattern 300 between the second metal pattern MP2 and the capacitor part 220 via the first disconnection control pattern 300 between the first metal pattern MP1 and the second metal pattern MP2 and via the second metal pattern MP2 exposed through the second contact hole CH2.

As a consequence, the first connecting pattern CP1 can connect the first metal pattern MP1 with the second metal pattern MP2 via the first disconnection control pattern 300 without being disconnected in spite of the under-cut between the second metal MP2 and the active pattern AP.

The fan-out part FO formed in the peripheral area PA of the base substrate 110 includes a fan-out line FL and a second contact part CT20.

The second contact part CT20 transfers a data signal outputted from the data driving part DD via the fan-out line FL to the data line DL. The second contact part CT20 includes a third metal pattern MP3, a fourth metal pattern MP4, an active pattern AP, a second connecting pattern CP2 and a second disconnection control pattern 310.

The third metal pattern MP3 extends from the fan-out line FL and includes a gate metal. The fourth metal pattern MP4 extends from the data line DL and includes a data metal. The fourth metal pattern MP4 is spaced apart from the third metal pattern MP3. The second connecting pattern CP2 electrically connects the third metal pattern MP3 with the fourth metal pattern MP4 though third and fourth contact holes CH3 and CH4.

The second disconnection control pattern 310 includes a second opening part OP2 exposing the fourth metal pattern MP4 through the fourth contact hole CH4.

A shape of the second contact part CT20 is the same or substantially the same as a shape of the first contact part CT10.

The pixel part P formed in the display area DA of the base substrate 110 includes a gate line GL, a data line DL, a pixel transistor TFT0, a pixel electrode PE and a color filter pattern CF.

The pixel transistor TFT0 includes a pixel gate electrode GE0, a pixel source electrode SE0, a pixel drain electrode DE0 and an active pattern AP.

The pixel gate electrode GE0 extends from the gate line GL and includes a gate metal. The pixel source electrode SE0 extends from the data line DL and includes a data metal. The pixel drain electrode DE0 is spaced apart from the pixel source electrode SE0 and includes a data metal.

The active pattern AP is disposed between the first insulating layer LY1 covering the pixel gate electrode GE0 and the pixel source and drain electrodes SE0 and DE0. The active pattern AP is disposed over the pixel gate electrode GE0 and extends from the pixel source electrode SE0 to the pixel drain electrode DE0.

The color filter pattern CF is formed on the second insulating layer LY2 covering the pixel source and drain electrodes SE0 and DE0. The color filter pattern CF corresponds to the pixel electrode PE. The color filter pattern CF includes a pixel contact hole CH0 exposing the pixel drain electrode DE0.

The pixel electrode PE is disposed on the color filter pattern. CF and is electrically connected to the pixel drain electrode DE0 through the pixel contact hole CH0. The pixel electrode PE includes a transparent electrode.

According to an exemplary embodiment, the first and second disconnection control patterns 300 and 310 include a material the same or substantially the same as the color filter pattern CF. According to an embodiment, the first and second disconnection control patterns 300 and 310 may include a material the same or substantially the same as an organic film.

Figure 5A:
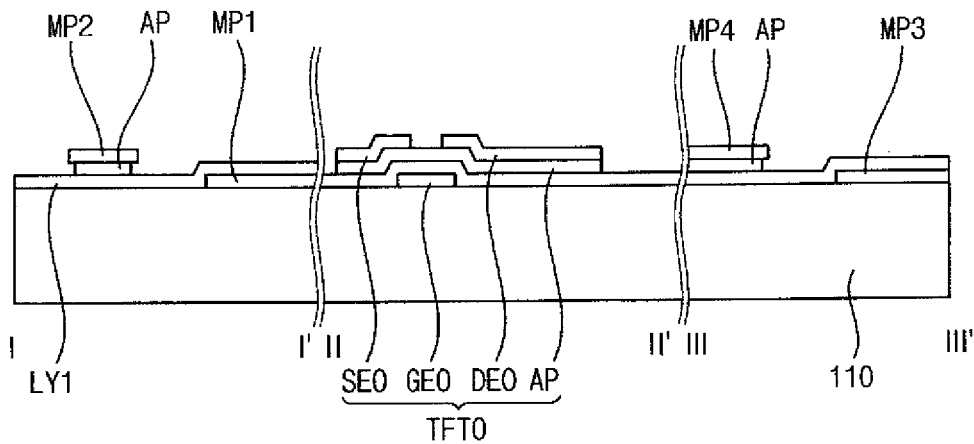
FIG. 5A and FIG. 5B are cross-sectional views illustrating a method of manufacturing the array substrate of FIG. 1.
Figure 5B:
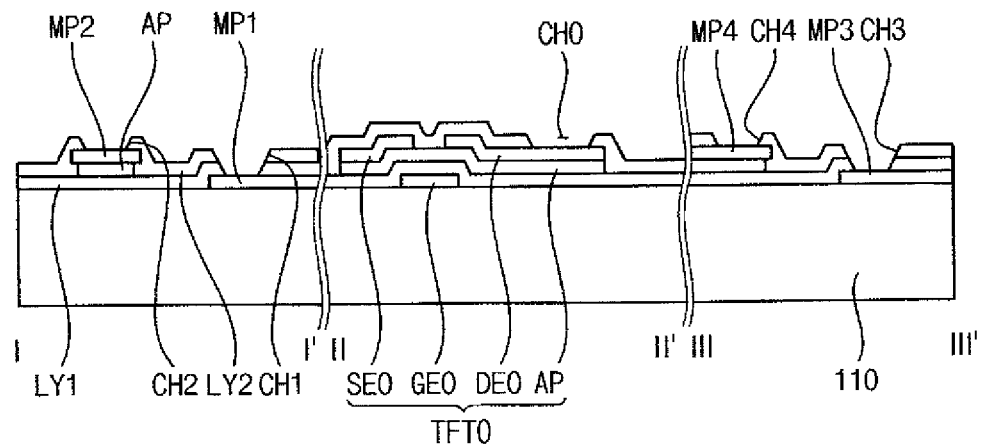

FIG. 5A and FIG. 5B are cross-sectional views illustrating a method of manufacturing the array substrate of FIG. 1.

Referring to FIG. 5A, a gate metal layer is formed on the base substrate 110, and then the gate metal layer is patterned and as a consequence a gate pattern is formed.

The gate pattern includes the fust gate electrode GE1, the first metal pattern. MP1 and the third metal pattern MP3 formed in the peripheral area PA and the pixel gate electrode GE0 formed in the display area DA.

For example, the gate metal layer is formed on the base substrate 110 using a metal deposition method such as a sputtering method, etc. The gate metal layer includes a metal, such as molybdenum (Mo), titanium (Ti), copper (Cu), aluminum (Al), chrome (Cr), or an alloy thereof. The gate metal layer includes a single layer or a multi-layer having at least two layers. Then, the gate metal layer is patterned by a photo etching process using a first mask, and as a consequence, the gate pattern is formed.

Then, a first insulating layer LY1, an active layer and a data metal layer are sequentially formed on the base substrate 110 on which the gate pattern is formed, and then the active layer and the data metal layer are patterned and as a consequence, the active pattern AP and a data pattern are formed.

The data pattern includes the source electrode SE1, the first drain electrode DE1, the second metal pattern MP2 and the fourth metal pattern MP4 in the peripheral area PA, and the pixel source and drain electrodes SE0 and DE0 in the display area DA. The active pattern AP is formed under the data pattern.

For example, the gate insulating layer 120 including silicon nitride (SiNx), an amorphous silicon (a-Si) layer and an n+ amorphous silicon (n+ a-Si) layer are sequentially formed on the base substrate 110, on which the gate pattern is formed, using a plasma enhanced chemical vapor deposition (PECVD) method.

Then, a data metal layer is formed on the n+ amorphous silicon (n+ a-Si) layer using a metal deposition method such as a sputtering process. For example, the data metal layer includes chrome (Cr), aluminum (Al), tantalum (Ta), molybdenum (Mo), titanium (Ti), tungsten (W), copper (Cu), silver (Ag) or an alloy thereof. The data metal layer includes a single layer or a multi-layer having at least two layers. Then, the active layer and the data metal layer are patterned by a photo etching process using a second mask, so that the active pattern AP and the data pattern are formed.

When the active layer and the data metal layer are etched, the active pattern AP is etched further than the data pattern to remove a stringer in which the data metal layer remains except for the data pattern, so that an under-cut between the data pattern and the active pattern AP may be formed.

Referring to FIG. 5B, the second insulating layer LY2 is formed on the base substrate 110 on which the data pattern is formed, and then the first, second, third and fourth contact holes CH, CH2, CH3 and CH4 and the pixel contact hole CH0 are formed in the first insulating layer LY1 and the second insulating layer LY2 by a photo etching process using a third mask.

The first contact hole CH1 exposes part of the first metal pattern MP1 in the peripheral area PA, the second contact hole CH2 exposes part of the second metal pattern MP2 in the peripheral area PA, the third contact hole CH3 exposes part of the third metal pattern MP3 in the peripheral area PA, and the fourth contact hole CH4 exposes part of the fourth metal pattern MP4 in the peripheral area PA.

The pixel contact hole CH0 exposes part of the pixel drain electrode DE0 in the display area DA.

Referring to FIG. 4 again, a color filter layer is formed on the second insulating layer LY2 including the first, second, third and fourth contact holes CH1, CH2, CH3 and CH3 and the pixel contact hole CH0, and then the color filter layer is etched and the first and second disconnection control pattern 300 and 310 are formed in the peripheral area PA and the color filter pattern CF is formed in the display area DA.

For example, the color filter layer is formed on the second insulating layer LY2, and then the first and second disconnection control pattern 300 and 310 and the color filter pattern CF including heights different from each other are formed by a photo etching process using a fourth mask. The fourth mask is a slit mask or a halftone mask. According to an embodiment, the first and second disconnection control pattern 300 and 310 have a first height, and the color filter pattern CF has a second height larger than the first height.

The first disconnection control pattern 300 is formed along an edge of the second metal pattern MP2 and exposes the second metal pattern MP2 through the second contact hole CH2. The first disconnection control pattern 300 overlaps an upper surface and a side surface of an end portion of the second metal pattern MP2.

The second disconnection control pattern 310 is formed along an edge of the fourth metal pattern MP4 and exposes the fourth metal pattern MP4 through the fourth contact hole CH4. The second disconnection control pattern 310 overlaps an upper surface and a side surface of an end portion of the fourth metal pattern MP4.

Then, a transparent electrode layer is formed on the base substrate 110 on which the first and second disconnection control pattern 300 and 310 and the color filter pattern CF are formed, and then the transparent electrode layer is patterned and a transparent electrode pattern is formed.

The transparent electrode layer includes indium tin oxide or indium zinc oxide. The transparent electrode pattern includes the first and second connecting patterns CP1 and CP2 in the peripheral area PA and the pixel electrode PE in the display area DA.

The first connecting pattern CP1 extends from the first metal pattern MP1 to the first disconnection control pattern 300 between the capacitor 220 and the second metal pattern MP2 via the first disconnection control pattern 300 between the first metal pattern MP1 and the second metal pattern MP2 and via the second metal pattern MP2.

The first connecting pattern CP1 is not formed along a side surface of the second metal pattern MP2 and a side surface of the active pattern AP, so that the first connecting pattern CP1 is independent from the under-cut between the second metal pattern MP2 and the active pattern AP. In other words, the first connecting pattern CP1 is not influenced by the under-cut. As a consequence, the first connecting pattern CP1 may be prevented from being disconnected.

The second connecting pattern CP2 extends from the third metal pattern MP3 to the second disconnection control pattern 310 between the data line DL and the fourth metal pattern MP4 via the second disconnection control pattern 310 between the third metal pattern MP3 and the fourth metal pattern MP4 and via the fourth metal pattern MP4.

The second connecting pattern CP2 is not formed along a side surface of the fourth metal pattern MP4 and a side surface of the active pattern AP, so that the second connecting pattern CP2 is independent from the under-cut between the fourth metal pattern MP4 and the active pattern AP. In other words, the second connecting pattern CP2 is not influenced by the under-cut. As a consequence, the second connecting pattern CP2 may be prevented from being disconnected.

According to an exemplary embodiment, the first and second disconnection control patterns 300 and 310 are formed by etching the color filter layer. According to an embodiment, the first and second disconnection control patterns 300 and 310 are formed by etching an organic film.

According to an exemplary embodiment, in at least one transistor of the stage of the gate driving part in the peripheral area PA, the first disconnection control pattern 300 is formed along the side surface of the second metal pattern MP2, and the first connecting pattern CP1 extends on the first disconnection control pattern 300. As a consequence, the first connecting pattern CP1 may be prevented from being disconnected even though the under-cut is formed between the second metal pattern MP2 and the active pattern AP.

In the fan-out part FO of the peripheral area PA, the second disconnection control pattern 310 is formed along the side surface of the fourth metal pattern MP4, and the second connecting pattern CP2 extends on the second disconnection control pattern 310. As a consequence, the second connecting pattern CP2 may be prevented from being disconnected even though the under-cut between the fourth metal pattern MP4 and the active pattern AP.

Figure 6:
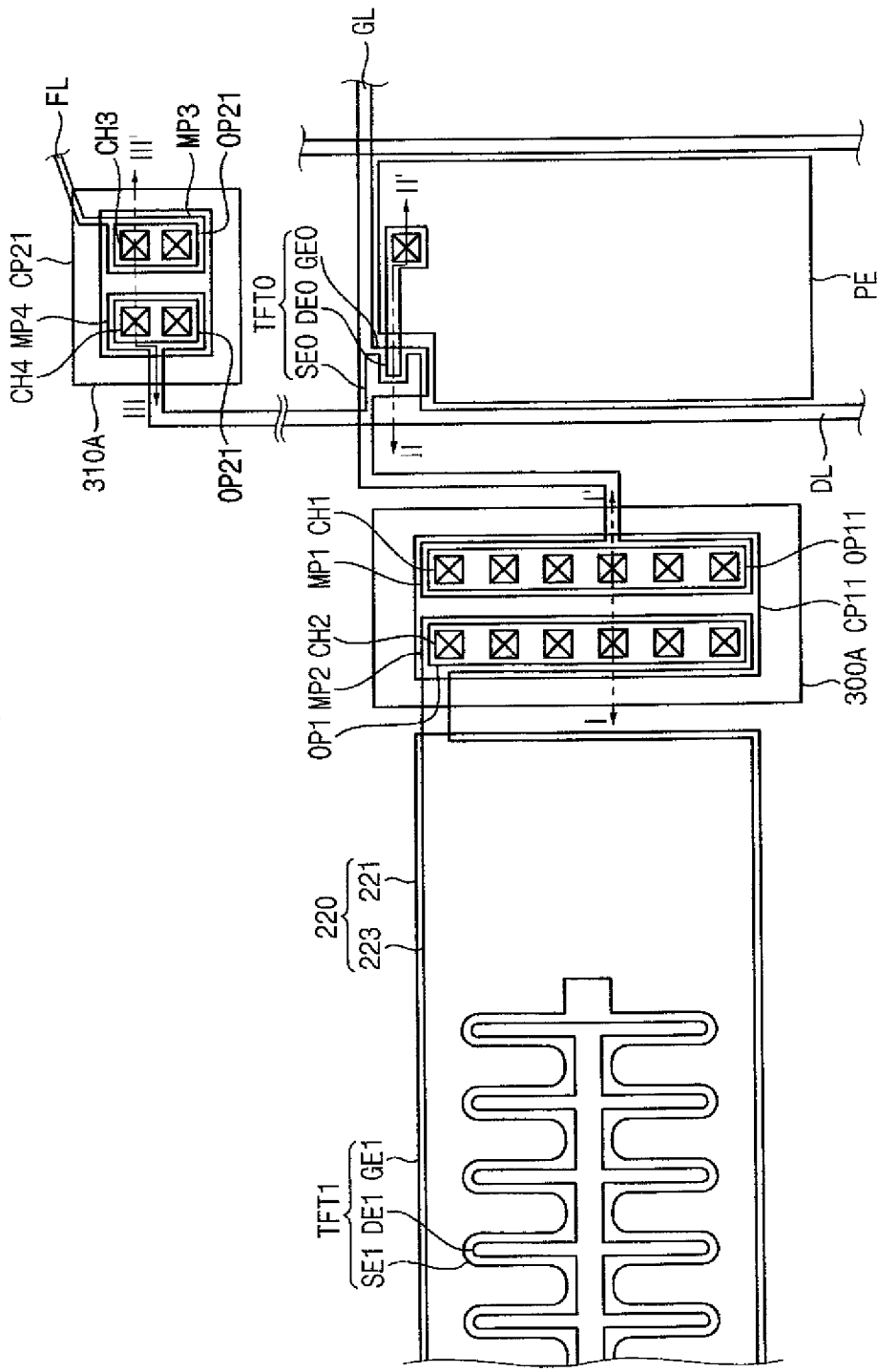
FIG. 6 is a plan view illustrating a gate driving part, a pixel part and a fan-out part of an array substrate according to an exemplary embodiment of the present invention.
Figure 7:
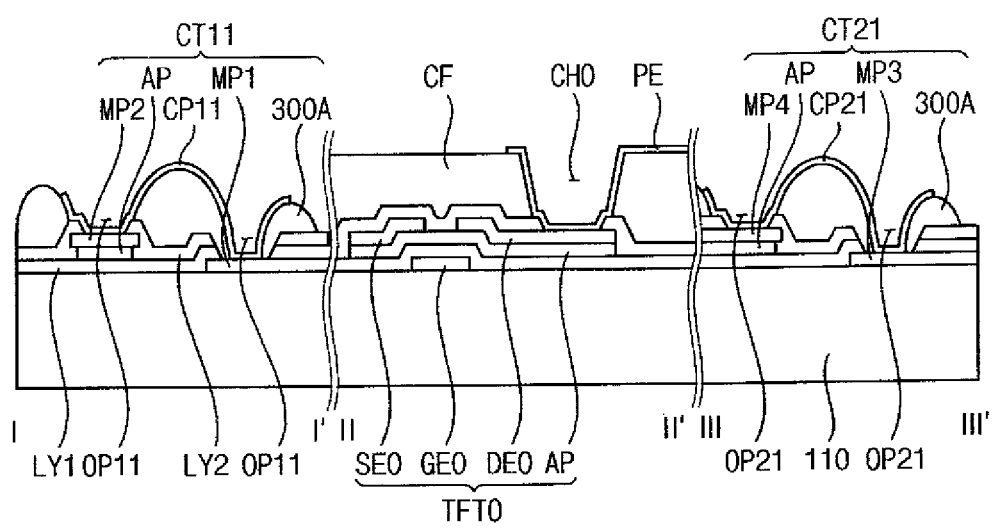
FIG. 7 is a cross-sectional view taken along a line I-I', a line II-II' and a line III-III' of FIG. 6.

FIG. 6 is a plan view illustrating a gate driving part, a pixel part and a fan-out part of an array substrate according to an exemplary embodiment of the present invention. FIG. 7 is a cross-sectional view taken along a line I-I', a line II-II' and a line III-III' of FIG. 6.

A display substrate according to an exemplary embodiment is the same or substantially the same as the display substrate described in connection with FIG. 1 except for the first contact part and the second contact part.

Referring to FIG. 6 and FIG. 7, a first contact part CT11 in a peripheral area PA of a base substrate 110 transfers a gate signal output from a first source electrode SE1 of a first transistor TFT1 to a gate line GL. The first contact part CT11 includes a first metal pattern MP1, a second metal pattern MP2, an active pattern AP, a first connecting pattern CP11 and a first disconnection control pattern 300A.

The first disconnection control pattern 300A is formed on the first and second metal patterns MP1 and MP2 and covers upper and side surfaces of each of the first and second metal pattern MP1 and MP2. According to an embodiment, the first disconnection control pattern 300A covers a side surface of the active pattern AP under the second metal pattern MP2.

The first disconnection control pattern 300A includes first openings OP11 exposing the first metal pattern MP1 through a first contact hole CH1 and exposing the second metal pattern MP2 through a first contact hole CH2. The first opening OP11 has a width smaller than a width of the first metal pattern MP1 or the second metal pattern MP2.

The first disconnection control pattern 300A is disposed between the first and second metal patterns MP1 and MP2 and the first connecting pattern CP11. The first disconnection control pattern 300A has an area larger than an area of the first connecting pattern CP11.

The first connecting pattern CP11 extends from the first disconnection control pattern 300A between the first metal pattern MP1 and the pixel part P to the first disconnection control pattern 300A between the capacitor part 220 and the second metal pattern MP2 via the first metal pattern MP1 exposed by the first contact hole CH1, via the first disconnection control pattern 300A between the first metal pattern MP1 and the second metal pattern MP2, and via the second metal pattern MP2 exposed by the second contact hole CH2.

The first connecting pattern CP11 is disposed on the first disconnection control pattern 300A, but is not disposed along a side surface of the active pattern AP, so that the first connecting pattern CP11 may connect the first metal pattern MP1 with the second metal pattern MP2 without being disconnected even when an under-cut is created between the active pattern AP and the second metal pattern MP2.

The second contact part CT21 in the peripheral area PA of the base substrate 110 transfers a data signal outputted from the data driving part DD via a fan-out line FL to a data line DL. The second contact part CT21 includes a third metal pattern MP3, a fourth metal pattern MP4, an active pattern AP, a second connecting pattern CP21 and a second disconnection control pattern 310A.

The second disconnection control pattern 310A includes second openings OP21 exposing the third metal pattern MP3 through the third contact hole CH3 and exposing the fourth metal pattern MP4 through the fourth contact hole CH4.

A shape of the second contact part CT21 is the same or substantially the same as a shape of the first contact part CT11.

According to an exemplary embodiment, the first disconnection control pattern 300A includes the first opening part OP11 and the second opening part OP21 spaced apart from the first opening part OP11, so that the first metal pattern MP11 and the second metal pattern MP21 may have a margin for alignment.

The second disconnection control pattern 310A includes the third opening part OP31 and the fourth opening part OP41 spaced apart from the third opening part OP31, so that the third metal pattern MP3 and the fourth metal pattern MP4 may have a margin for alignment.

Figure 8:
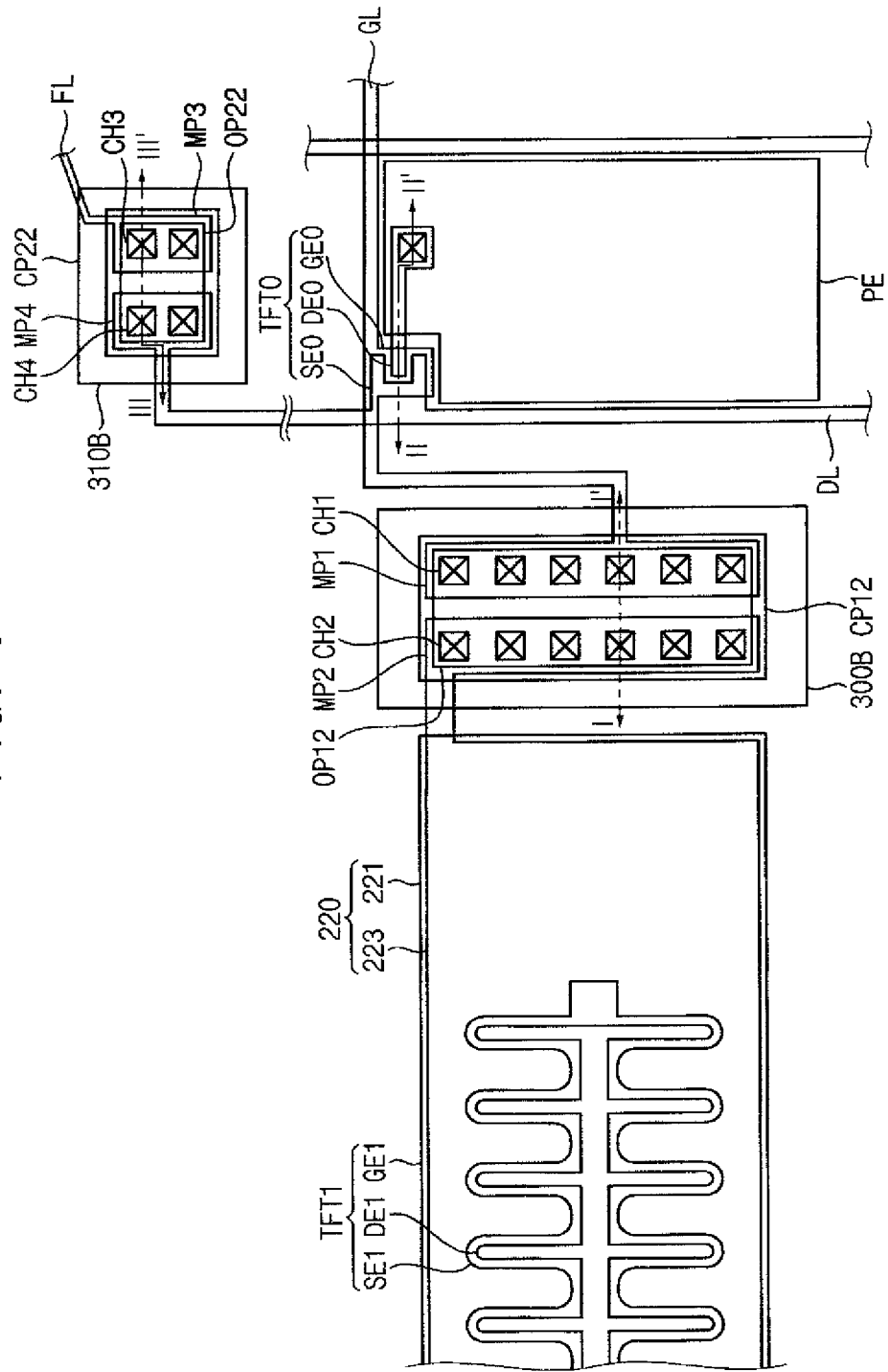
FIG. 8 is a plan view illustrating a gate driving part, a pixel part and a fan-out part of an array substrate according to an exemplary embodiment of the present invention.
Figure 9:
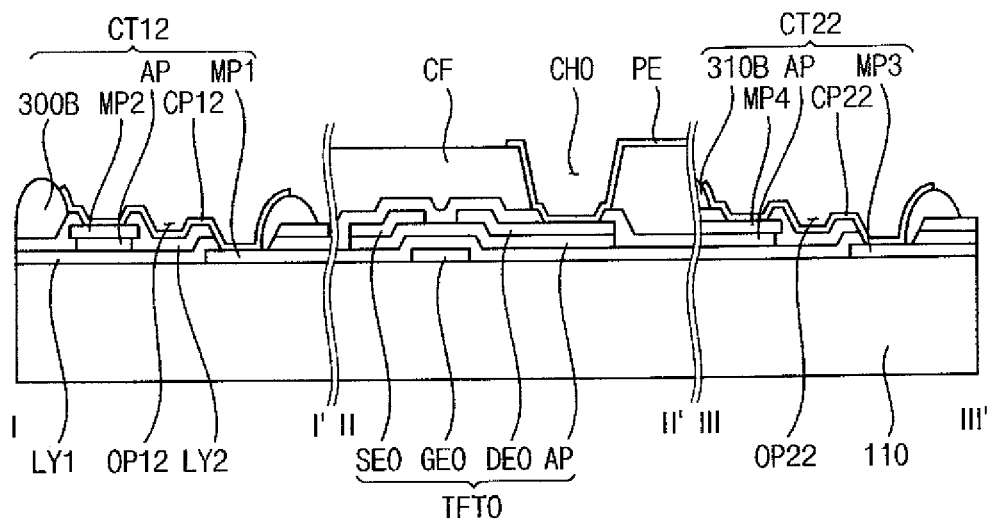
FIG. 9 is a cross-sectional view taken along a line I-I', a line II-II' and a line III-III' of FIG. 8.

FIG. 8 is a plan view illustrating a gate driving part, a pixel part and a fan-out part of an array substrate according to an exemplary embodiment of the present invention. FIG. 9 is a cross-sectional view taken along a line I-I', a line II-II' and a line of FIG. 8.

A display substrate according to an exemplary embodiment is the same or substantially the same as the display substrate described in connection with FIG. 1 except for the first contact part and the second contact part.

Referring to FIG. 8 and FIG. 9, a first contact part CT12 in a peripheral area PA of a base substrate 110 transfers a gate signal output from a first source electrode SE1 of a first transistor TFT1 to a gate line GL. The first contact part CT12 includes a first metal pattern MP1, a second metal pattern MP2, an active pattern AP, a first connecting pattern CP12 and a first disconnection control pattern 300B.

The first disconnection control pattern 300B is formed on the first and second metal patterns MP1 and MP2 and covers an upper surface and a side surface of each of the first and second metal patterns MP1 and MP2. According to an embodiment, the first disconnection control pattern 300B covers a side surface of the active pattern AP under the second metal pattern MP2.

The first disconnection control pattern 300B includes a first opening OP12 exposing a first metal pattern MP1 through a first contact hole CH1, a second metal pattern MP2 through a second contact hole CH2 and a second insulating layer LY2 between the first metal pattern MP1 and the second metal pattern MP2.

A width of the first opening part OP12 is larger than a distance from the first contact hole CH1 to the second contact hole CH2, and is smaller than a distance from an edge of the first metal pattern MP1 adjacent to a pixel part P to an edge of the second metal pattern MP2 adjacent to a capacitor part 220.

The first disconnection control pattern 300B is disposed between the first and second metal patterns MP1 and MP2 and the first connecting pattern CP12. The first disconnection control pattern 300B has an area larger than an area of the first connecting pattern CP12.

The first connecting pattern CP12 extends from the first disconnection control pattern 300B between the first metal pattern MP1 and the pixel part P to the first disconnection control pattern 300B between the capacitor part 220 and the second metal pattern MP2 via the first metal pattern MP1 exposed through the first contact hole CH1, via the second insulating layer LY2 between the first metal pattern MP1 and the second metal pattern. MP2, and via the second metal pattern MP2 exposed through the second contact hole CH2.

The first connecting pattern CP12 is disposed on the first disconnection control pattern 300B, but is not disposed along a side surface of the active pattern AP, so that the first connecting pattern CP12 may connect the first metal pattern MP1 with the second metal pattern MP2 without being disconnected even when an under-cut is created between the active pattern AP and the second metal pattern MP2.

The second contact part CT22 in the peripheral area PA of the base substrate 110 transfers a data signal outputted from a data driving part DD via a fan-out line FL to a data line DL. The second contact part CT22 includes a third metal pattern MP3, a fourth metal pattern MP4, an active pattern AP, a second connecting pattern CP22 and a second disconnection control pattern 310B.

The second disconnection control pattern 310B includes a second opening part OP22 exposing the third metal pattern MP3 through a third contact hole CH3, the fourth metal pattern MP4 through the fourth contact hole CH4 and the second insulating layer LY2 between the third metal pattern MP3 and the fourth metal pattern MP4.

A shape of the second contact part CT21 is the same or substantially the same as a shape of the first contact part CT11.

According to an exemplary embodiment, the first disconnection control pattern 300B includes the first opening part OP12 exposing the first metal pattern MP12 and the second metal pattern MP22, so that the first disconnection control pattern 300B may have a margin for alignment.

The second disconnection control pattern 310B includes a second opening part OP22 exposing the third metal pattern MP32 and the fourth metal pattern MP42, so that the second disconnection control pattern 310B may have a margin for alignment.

Figure 10:
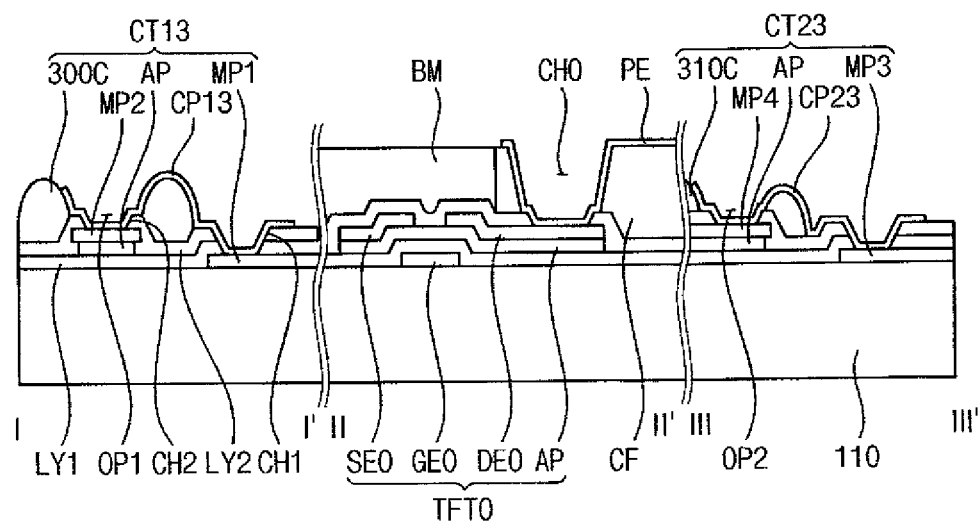
FIG. 10 is a cross-sectional view illustrating an array substrate according to an exemplary embodiment of the present invention.

FIG. 10 is a cross-sectional view illustrating an array substrate according to an exemplary embodiment of the present invention.

A display substrate according to an exemplary embodiment is the same or substantially the same as the display substrate described in connection with FIG. 1 except for the first and second disconnection control patterns and the light blocking pattern.

Referring to FIG. 10, a first contact part CT13 in a peripheral area PA of a base substrate 110 transfers a gate signal output from a first source electrode SE1 of a first transistor TFT1 to a gate line GL. The first contact part CT13 includes a first metal pattern MP1, a second metal pattern MP2, an active pattern AP, a first connecting pattern CP13 and a first disconnection control pattern 300C.

The first disconnection control pattern 300C includes a material the same or substantially the same as a block pattern BM of a pixel part P. The first disconnection control pattern 300C has a height smaller than a height of the light blocking pattern BM.

The second contact part CT23 in the peripheral area PA of the base substrate 110 transfers a data signal outputted from a data driving part DD via a fan-out line FL to a data line DL. The second contact part CT23 includes a third metal pattern MP3, a fourth metal pattern MP4, an active pattern AP, a second connecting pattern CP23 and a second disconnection control pattern 310C.

The second disconnection control pattern 310C includes a material the same or substantially the same as a light blocking pattern BM. The second disconnection control pattern 310C has a height smaller than a height of the light blocking pattern BM.

The pixel part P in the display area DA of the base substrate 110 includes a gate line GL, a data line DL, a pixel transistor TFT0, a pixel electrode PE, a color filter pattern CF and the light blocking pattern BM.

The color filter pattern CF is formed on the second insulating layer LY2 covering a pixel source electrode SE0 and a pixel drain electrode DE0. The color filter pattern CF corresponds to the pixel electrode PE. The color filter pattern CF includes a pixel contact hole CH0 exposing the pixel drain electrode DE0.

The light blocking pattern BM is formed on the second insulating layer LY2. The light blocking pattern BM is disposed between pixel electrodes PE adjacent to each other. The light blocking pattern BM corresponds to the pixel transistor TFT0.

According to an embodiment, the light blocking pattern BM overlaps part of the color filter pattern CF.

According to an exemplary embodiment, the display substrate includes the light blocking pattern BM, and the first and second disconnection control patterns 300C and 310C include a material the same or substantially the same as the light blocking pattern BM. As a consequence, a manufacturing process may be simplified.

Figure 11:
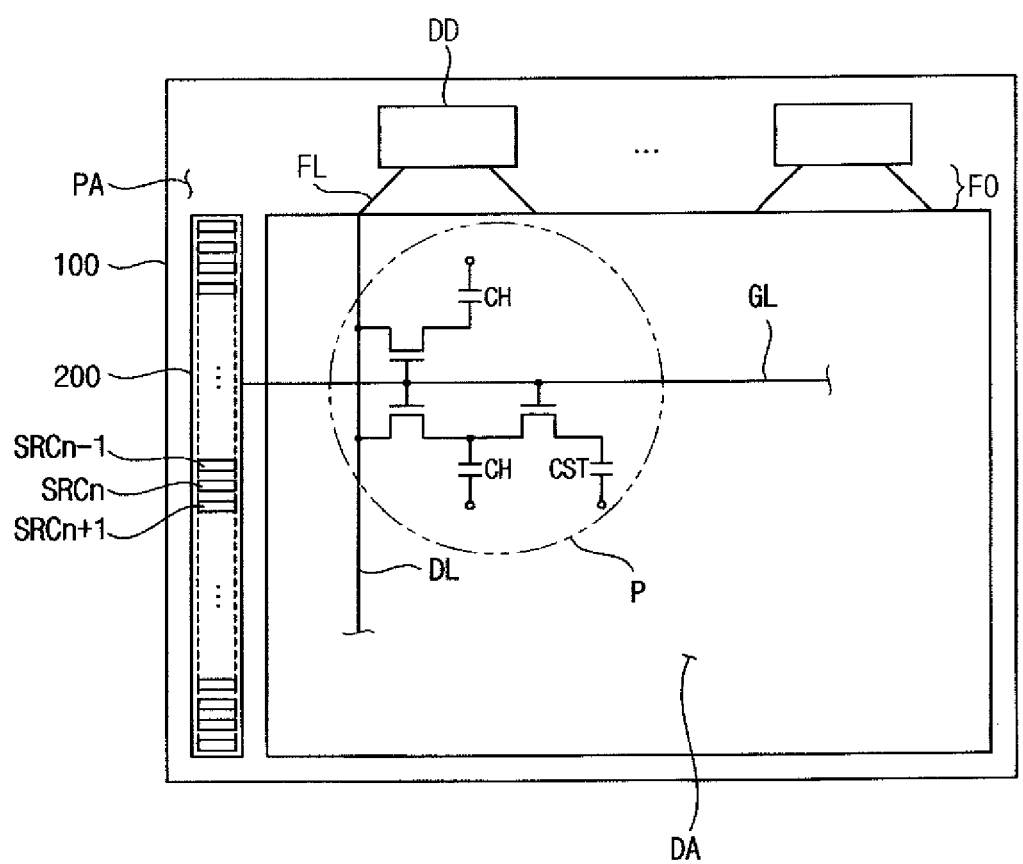
FIG. 11 is a cross-sectional view illustrating an array substrate according to an exemplary embodiment of the present invention.
Figure 12:
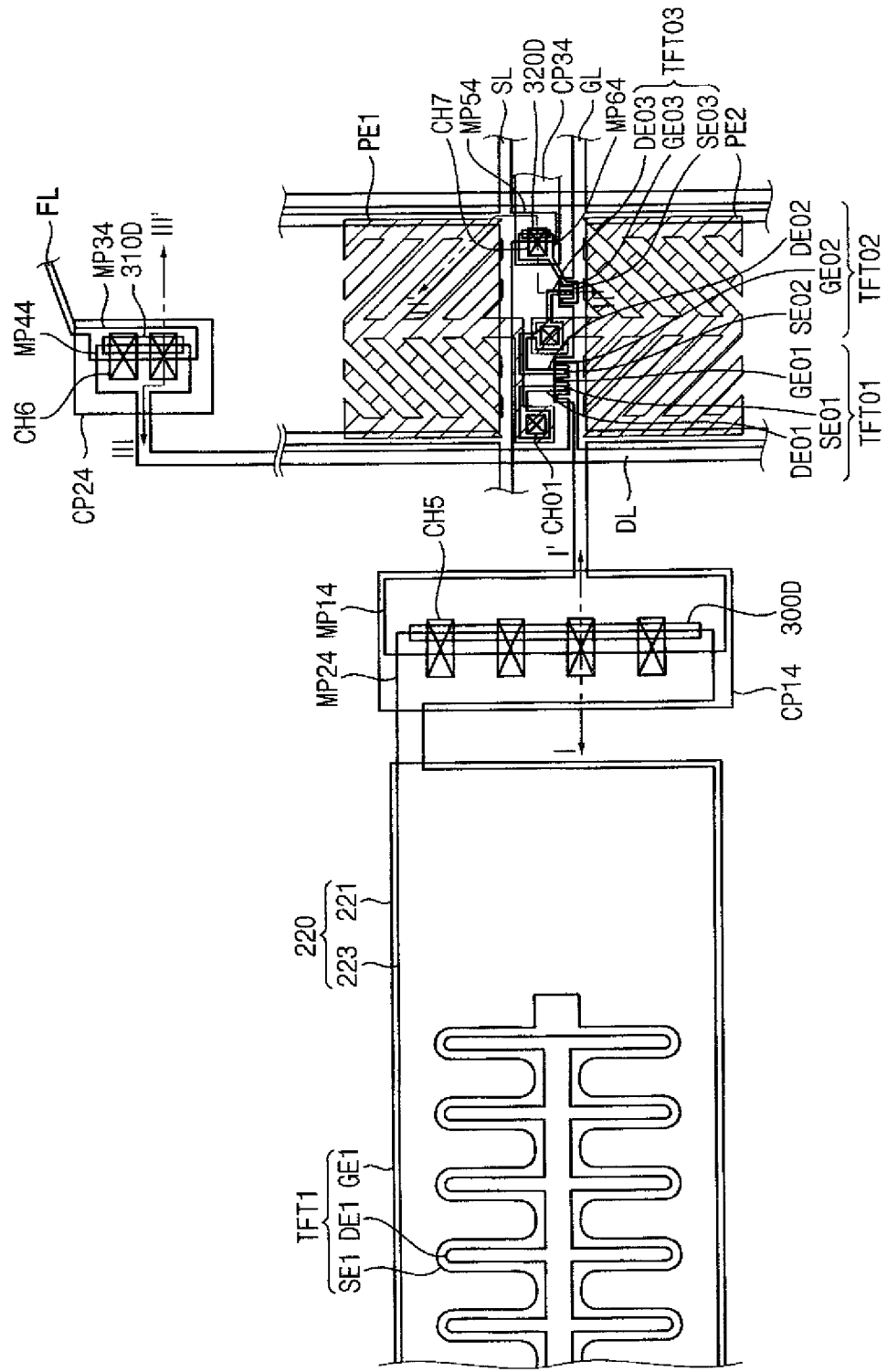
FIG. 12 is a plan view illustrating the gate driving part, pixel part, and fan-out part of FIG. 11.
Figure 13:
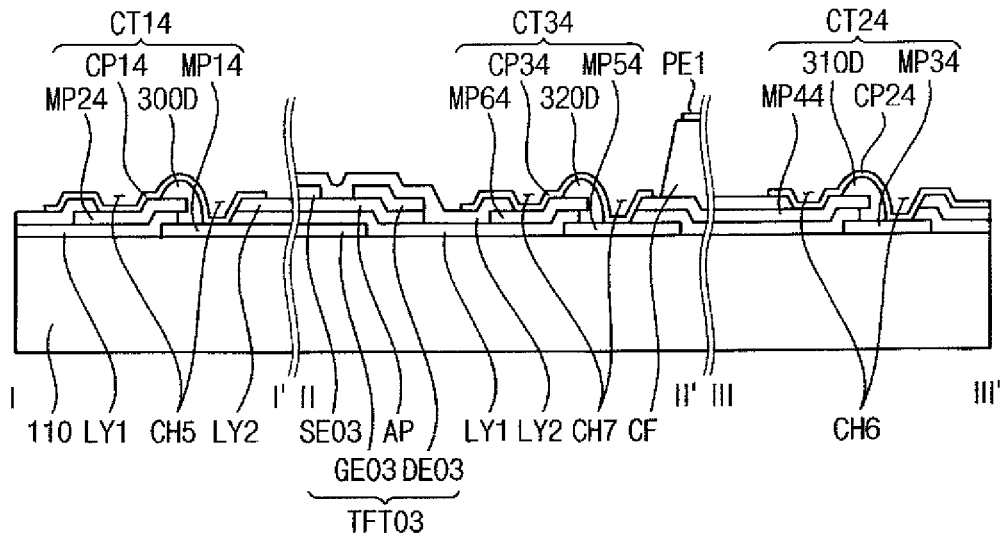
FIG. 13 is a cross-sectional view taken along a line I-I', a line II-II' and a line III-III' of FIG. 12.

FIG. 11 is a cross-sectional view illustrating an array substrate according to an exemplary embodiment of the present invention. FIG. 12 is a plan view illustrating the gate driving part, pixel part and fan-out part of FIG. 11. FIG. 13 is a cross-sectional view taken along a line I-I', a line II-II' and a line of FIG. 12.

A display substrate according to an exemplary embodiment is the same or substantially the same as the display substrate described in connection with FIG. 1 except for the first and second contact parts and the pixel part.

Referring to FIG. 11 to FIG. 13, a first contact part CT14 in a peripheral area PA of a base substrate 110 transfers a gate signal output from a first source electrode SE1 of a first transistor TFT1 to a gate line GL. The first contact part CT14 includes a first metal pattern MP14, a second metal pattern MP24, a first insulating layer LY1, a connecting pattern CP14 and a first disconnection control pattern 300D.

The first metal pattern MP14 extends from the gate line GL1 and includes a gate metal. The second metal pattern MP24 extends from the first source electrode SE1 of the first transistor TFT1 and includes a data metal. The second metal pattern MP24 is disposed over the first metal pattern MP14 and overlaps part of the first metal pattern MP14. As a consequence, a size of the peripheral area PA may be reduced.

The first insulating layer LY1 is disposed on the base substrate 110 and covers the first metal pattern MP14. The first insulating layer LY1 includes a fifth contact hole CH5 exposing the first metal pattern MP14 and the second metal pattern MP24.

The first insulating layer LY1 is disposed under the second metal pattern MP24. The first insulating layer LY1 is etched further than the second metal pattern MP24 when the fifth contact hole CH5 is formed, so that an under-cut may be formed between the first insulating layer LY1 and the second metal pattern MP24.

The first connecting pattern CP14 electrically connects the first metal pattern MP1 with the second metal pattern MP2 through the fifth contact hole CH5. The first connecting pattern CP14 includes a transparent metal.

The first disconnection control pattern 300D is disposed along an edge of an upper surface of the second metal pattern MP24 overlapping the first metal pattern MP14 and a side surface of the second metal pattern MP24. The first disconnection control pattern 300D covers the upper surface of the second metal pattern MP24 and the side surface of the second mewl pattern MP24 and an upper surface of the first metal pattern MP14.

The first disconnection control pattern 300D includes a material the same or substantially the same as a color filter pattern CF of the pixel part P. For example, the first disconnection control pattern 300 includes a material the same or substantially the same as a blue color filter pattern.

The first connecting pattern CP14 extends from the first metal pattern MP14 exposed through the fifth contact hole CH5 to the second metal pattern MP24 exposed through the fifth contact hole CH5 via the first disconnection control pattern 300D.

The first disconnection control pattern 300D allows the first connecting pattern CP14 to connect the first metal pattern MP14 with the second metal pattern MP24 without being disconnected even when an under-cut occurs between the first insulating layer LY1 and the second metal pattern MP24.

The second contact part CT24 in the peripheral area PA of the base substrate 110 transfers a data signal outputted from the data driving part DD via a fan-out line FL to the data line DL. The second contact part CT24 includes a third metal pattern MP34, a fourth metal pattern MP44, the first insulating layer LY1, a second connecting pattern CP24 and a second disconnection control pattern 310D.

The third metal pattern MP34 extends from the fan-out line FL and includes a gate metal. The fourth metal pattern MP44 extends from the data line DL and includes a data metal. The fourth metal pattern MP44 is disposed over the third metal pattern MP34 and overlaps part of the third metal pattern MP34. As a consequence, a size of the peripheral area PA may be reduced.

The first insulating layer LY1 is disposed on the base substrate and covers the third metal pattern MP34. The first insulating layer LY1 includes a sixth contact hole CH6 exposing the third metal pattern MP34 and the fourth metal pattern MP44.

The second connecting pattern CP24 electrically connects the third metal pattern MP34 with the fourth metal pattern MP44 through the sixth contact hole CH6.

A shape of the second contact part CT24 is the same or substantially the same as a shape of the first contact part CT 14

The pixel part P in the display area DA of the base substrate 110 includes a gate line GL, a data line DL, a first pixel transistor TFT01, a second pixel transistor TFT02, a third pixel transistor TFT03, a storage line SL, a third contact part CT34, a first pixel electrode PE1, a second pixel electrode PE2 and a color filter pattern CF.

The first pixel transistor TFT01 includes a first pixel gate electrode GE01, a first pixel source electrode SE01, a first pixel drain electrode DE01 and an active pattern AP.

The first pixel gate electrode GE01 extends from the gate line GL and includes a gate metal. The first pixel source electrode SE01 extends from the data line DL and includes a data metal. The first pixel drain electrode DE01 is spaced apart from the first pixel source electrode SE01 and is electrically connected to the first pixel electrode PE1 through a first pixel contact hole CH01. The first pixel drain electrode DE01 includes a data metal.

The active pattern AP is disposed between the first insulating layer LY1 covering the first pixel gate electrode GE01 and the first pixel source and drain electrodes SE01 and DE01. The active pattern AP extends from the first pixel source electrode SE01 to the first pixel drain electrode DE01 over the first pixel gate electrode GE01.

The second pixel transistor TFT02 includes a second pixel gate electrode GE02, a second pixel source electrode SE02, a second pixel drain electrode DE02 and the active pattern AP.

The second pixel gate electrode GE02 extends from the gate line GL and includes a gate metal. The second pixel source electrode SE02 extends from the first pixel source electrode SE01 and includes a data metal. The second pixel drain electrode DE02 is spaced apart from the second pixel source electrode SE02 and is electrically connected to the second pixel electrode PE2 through the second pixel contact hole CH02. The second pixel drain electrode DE02 includes a data metal.

The active pattern AP is disposed between the first insulating layer LY1 covering the second pixel gate electrode GE02 and the second pixel source and drain electrodes SE02 and DE02. The active pattern AP extends from the second pixel source electrode SE02 to the second pixel drain electrode DE02 over the second pixel gate electrode GE02.

The third pixel transistor TFT03 includes a third pixel gate electrode GE03, a third pixel source electrode SE03, a third pixel drain electrode DE03 and the active pattern AP.

The third pixel gate electrode GE03 extends from the gate line GL and includes a gate metal. The third pixel gate electrode GE03 is spaced apart from the first and second pixel gate electrodes GE01 and GE02. The third pixel drain electrode DE03 is connected to the second pixel drain electrode DE02 and the second pixel electrode PE2, and includes a data metal.

The active pattern AP is disposed between the first insulating layer LY1 covering the third pixel gate electrode GE03 and the third pixel source and drain electrodes SE03 and DE03. The active pattern AP extends from the third pixel source electrode SE03 to the third pixel drain electrode DE03 over the third pixel gate electrode GE03.

The storage line SL is parallel to at least one of the gate line GL and the data line DL.

The third contact part CT34 includes a fifth metal pattern MP54, a sixth metal pattern MP64, the first insulating layer LY1, a third connecting pattern CP34 and a third disconnection control pattern 320D.

The fifth metal pattern MP54 extends from the storage line SL and includes a gate metal. The sixth metal pattern MP64 extends from the third pixel source electrode SE03 of the third pixel transistor TFT03 and includes a data metal. The sixth metal pattern MP64 is disposed over the fifth metal pattern MP54 and overlaps part of the fifth metal pattern MP54. As a consequence, a size of the third contact part CT34 may be reduced, so that an aperture ratio of the pixel part P may be increased.

The first insulating layer LY1 is disposed on the base substrate 110 and covers the fifth metal pattern MP54. The first insulating layer LY1 includes a seventh contact hole CH7 exposing the fifth metal pattern MP54 and the sixth metal pattern MP64 together.

The third connecting pattern CP34 electrically connects the fifth metal pattern MP54 with the sixth metal pattern MP64 through the seventh contact hole CH7.

A shape of the third contact part CT34 is the same or substantially the same as a shape of the first contact part CT14.

The first, second and third pixel transistors TFT01, TFT02 and TFT03 and the third contact part CT34 are disposed between the first pixel electrode PE1 and the second pixel electrode PE2.

The color filter pattern CF is formed on the second insulating layer LY2 and covers the first, second and third pixel transistors TFT01, TFT02 and TFT03. The color filter pattern CF corresponds to the first and second pixel electrodes PE1 and PE2. The color filter pattern CF includes the first and second pixel contact holes CH01 and CH02 exposing the first and second pixel drain electrodes DE01 and DE02.

The first pixel electrode PE1 is disposed on the color filter pattern CF and is electrically connected to the first pixel drain electrode DE01 through the first pixel contact hole CH01.

The first pixel electrode PE1 is driven by the first pixel transistor TFT01. The first pixel electrode PE1 includes a center electrode, finger electrodes extending from the center electrode by a certain angle, and edge electrodes connecting the finger electrodes with each other.

The second pixel electrode PE2 is disposed on the color filter pattern CF and is electrically connected to the second pixel drain electrode DE02 through the second pixel contact hole CH02.

The second pixel electrode PE2 is driven by the second and third pixel transistors TFT02 and TFT03. The second pixel electrode PE2 has a symmetrical shape with the first pixel electrode PE1.

According to an exemplary embodiment, the first, second and third disconnection control pattern 300D, 310D and 320D include a material the same or substantially the same as the color filter pattern CF. According to an embodiment, the first, second and third disconnection control pattern 300D, 310D and 320D include a material the same or substantially the same as an organic film.

According to an embodiment, the first, second and third disconnection control pattern 300D, 310D and 320D include a material the same or substantially the same as an light blocking pattern.

Figure 14:
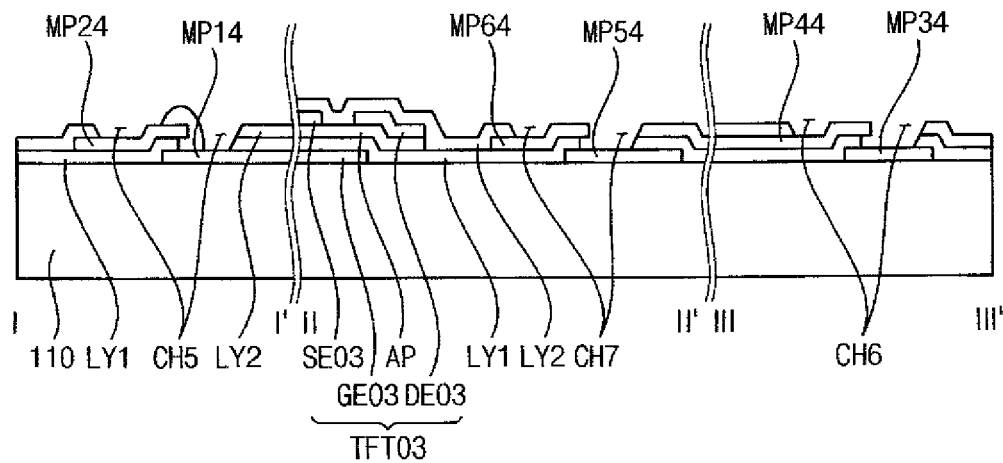
FIG. 14 is a cross-sectional view illustrating a method of manufacturing the array substrate of FIG. 13.

FIG. 14 is a cross-sectional view illustrating a method of manufacturing the array substrate of FIG. 12.

Referring to FIG. 14, a gate metal layer is formed on the base substrate 110, and then the gate metal layer is patterned and a gate pattern is formed.

The gate pattern includes a first gate electrode GE1, a first metal pattern MP14 and a third metal pattern MP34 in the peripheral area PA and a gate line GL, a storage line SL, first, second and third pixel gate electrodes GE01, GE02 and GE03 and a fifth metal pattern MP54 in the pixel area DA.

A first insulating layer LY1 and an active layer are sequentially formed on the base substrate 110 on which the gate pattern is formed, and then the active layer is patterned, so that an active pattern AP is formed on the first insulating layer LY1.

The active pattern AP is formed over the first gate electrode GE1 of the first transistor TFT1 in the peripheral area PA and the first, second and third pixel gate electrodes GE01, GE02 and GE03 of the first, second and third pixel transistors TFT01, TFT02 and TFT03 in the display area DA.

A data metal layer is formed on the base substrate 110 on which the active pattern AP is formed, and then the data metal layer is patterned so that a data pattern is formed.

The data pattern includes a first source electrode SE1, a first drain electrode DE1, a second metal pattern MP24 and a fourth metal pattern MP44 in the peripheral area PA and a data line DL, first, second and third pixel source electrodes SE01, SE02 and SE03, first, second and third drain electrodes DE01, DE02 and DE03 and a sixth metal pattern MP64 in the display area DA.

A second insulating layer LY2 is formed on the base substrate 110 on which the data pattern is formed, and then the fifth, sixth and seventh contact holes CH5, CH6 and CH7 and the first and second pixel contact holes CH01 and CH02 are formed in the first and second insulating layers LY1 and LY2 by a photo etching process using a third mask.

The fifth contact hole CH5 exposes the first metal pattern MP14 and the second metal pattern MP24 in the peripheral area PA, the sixth contact hole CH6 exposes the third metal pattern MP34 and the fourth metal pattern MP44 in the peripheral area PA, and the seventh contact hole CH7 exposes the fifth metal pattern MP54 and the sixth metal pattern MP64 in the display area DA.

The first pixel contact hole CH01 exposes part of the first pixel drain electrode DE01 in the display area DA, and the second pixel contact hole CH02 exposes part of the second pixel drain electrode DE02 in the display area DA.

When the fifth, sixth and seventh contact holes CH5, CH6 and CH7 are formed in the first and second insulating layers LY1 and LY2, a side surface of the first insulating layer LY1 under the data pattern is exposed.

The first insulating layer LY1 under the data pattern remains. The first insulating layer LY1 under the data pattern is etched further than the data pattern, so that an under-cut is formed between the data pattern and the first insulating layer LY1. For example, a side surface of the data pattern exposed through the fifth, sixth and seventh contact holes CH5, CH6 and CH7 may protrude further than a side surface of the first insulating layer LY1 exposed through the fifth, sixth and seventh contact holes CH5, CH6 and CH7.

Referring to FIG. 13 again, a color filter layer is formed on the second insulating layer LY2 in which the fifth, sixth and seventh contact holes CH5, CH6 and CH7 and the first and second pixel contact holes CH01 and CH02 are formed, and then the color filter layer is etched, so that the first and second disconnection control pattern 300D and 310D are formed in the peripheral area PA, and the color filter pattern CF and the third disconnection control pattern 320D are formed in the display area DA.

For example, the color filter layer is formed on the second insulating layer LY2, and then the first, second and third disconnection control patterns 300D, 310D and 320D and the color filter pattern CF having heights different from each other are formed by a photo etching process using a fourth mask. The fourth mask is a slit mask or a half-tone mask. According to an embodiment, the first, second and third disconnection control patterns 300D, 310D and 320D have a first height, and the color filter pattern CF has a second height larger than the first height.

The first disconnection control pattern 300D is formed along an upper surface and a side surface of an end portion of the second metal pattern MP24 overlapping the first metal pattern MP14 and along a side surface of the first insulating layer LY1.

The second disconnection control pattern 310D is formed along an upper surface and a side surface of an end portion of the fourth metal pattern MP44 overlapping the third metal pattern MP34 and along a side surface of the first insulating layer LY1.

The third disconnection control pattern 320D is formed along an upper surface and a side surface of an end portion of the sixth metal pattern MP64 overlapping the fifth metal pattern MP54 and along a side surface of the first insulating layer LY1.

The color filter pattern CF is formed to correspond to the first and second pixel electrodes PE1 and PE2.

A transparent electrode layer is formed on the base substrate 110 on which the first, second and third disconnection control patterns 300D, 310D and 320*d* and the color filter pattern CF are formed, and then the transparent electrode layer is patterned, so that transparent electrode pattern is formed.

The first connecting pattern CP14 extends from the first metal pattern MP14 exposed through the fifth contact hole CH5 to the second metal pattern MP24 exposed through the fifth contact hole CH5 via the first disconnection control pattern 300D.

The first connecting pattern CP14 is not formed along the side surface of the second metal pattern MP24 and the side surface of the first insulating layer LY1, so that the first connecting pattern CP14 is independent from an under-cut between the first insulating layer LY1 and the second metal pattern MP24. In other words, the first connecting pattern CP14 is not influenced by the under-cut, and as a consequence, the disconnection of the first connecting pattern CP14 may be prevented.

The second connecting pattern CP24 extends from the third metal pattern MP34 exposed through the sixth contact hole CH6 to the fourth metal pattern MP44 exposed through the sixth contact hole CH6 via the second disconnection control pattern 310D.

The second connecting pattern CP24 is not formed along the side surface of the fourth metal pattern MP44 and the side surface of the first insulating layer LY1, so that the second connecting pattern CP24 is independent from an under-cut between the first insulating layer LY1 and the fourth metal pattern MP44. In other words, the second connecting pattern CP24 is not influenced by the under-cut, and as a consequence, the disconnection of the second connecting pattern CP24 may be prevented.

The third connecting pattern CP34 extends from the fifth metal pattern MP54 exposed through the seventh contact hole CH7 to the sixth metal pattern MP64 exposed through the seventh contact hole CH7 via the third disconnection control pattern 320D.

The third connecting pattern CP34 is not formed along the side surface of the sixth metal pattern MP64 and the side surface of the first insulating layer LY1, so that the third connecting pattern CP34 is independent from an under-cut between the first insulating layer LY1 and the sixth metal pattern MP64. In other words, the third connecting pattern CP34 is not influenced by the under-cut, and as a consequence, the disconnection of the third connecting pattern CP34 may be prevented.

According to an exemplary embodiment, the first, second and third disconnection control patterns 300D, 310D and 320D are formed by etching the color filter layer. Alternatively, the first, second and third disconnection control patterns 300D, 310D and 320D are formed by etching an organic film.

According to an embodiment, the first, second and third disconnection control patterns 300D, 310D and 320D is formed by etching the light blocking pattern.

According to an exemplary embodiment, the fifth metal pattern MP54 of the third contact part CT34 overlaps the sixth metal pattern MP64 of the third contact part CT34. According to an embodiment, the fifth metal pattern MP54 of the third contact part CT34 is spaced apart form the sixth metal pattern MP64 of the third contact part CT34.

According to an exemplary embodiment, the active layer is patterned using a mask different from a mask used when the data metal layer is patterned. According to an embodiment, the active layer is patterned using a mask the same or substantially the same as a mask sued when the data metal layer is patterned. The active pattern AP is formed under the first, second and third contact parts CT14, CT24 and CT34, so that an under-cut may be formed between the data pattern and the active pattern AP such as an under-cut between the data pattern and the first insulating layer LY1. However, the first, second, and third disconnection control patterns 300D, 310D, and 320D may prevent the first, second and third connecting patterns CP14, CP24 and CP34 from being disconnected.

According to an exemplary embodiment, the first, second and third contact parts CT14, CT24 and CT34 include the first, second and third disconnection control patterns 300D, 310D and 320D, respectively, so that the first, second and third connecting patterns CP14, CP24 and CP34 may be prevented from being disconnected.

In at least one transistor of the stage of the gate driving part in the peripheral area PA, the first metal pattern MP14 overlaps the second metal pattern MP24, so that a size of the first contact part CT14 may be reduced. As a consequence, a size of the peripheral area PA may be reduced.

In the fan-out part FO of the peripheral area PA, the third metal pattern MP34 overlaps the fourth metal pattern MP44, so that a size of the second contact part CT24 may be reduced. As a consequence, a size of the peripheral area PA may be reduced.

The pixel part P of the display area DA, the fifth metal pattern MP54 overlaps the sixth metal pattern MP64, so that a size of the third contact part CT34 may be reduced. As a consequence, an aperture may be increased.

Figure 15:
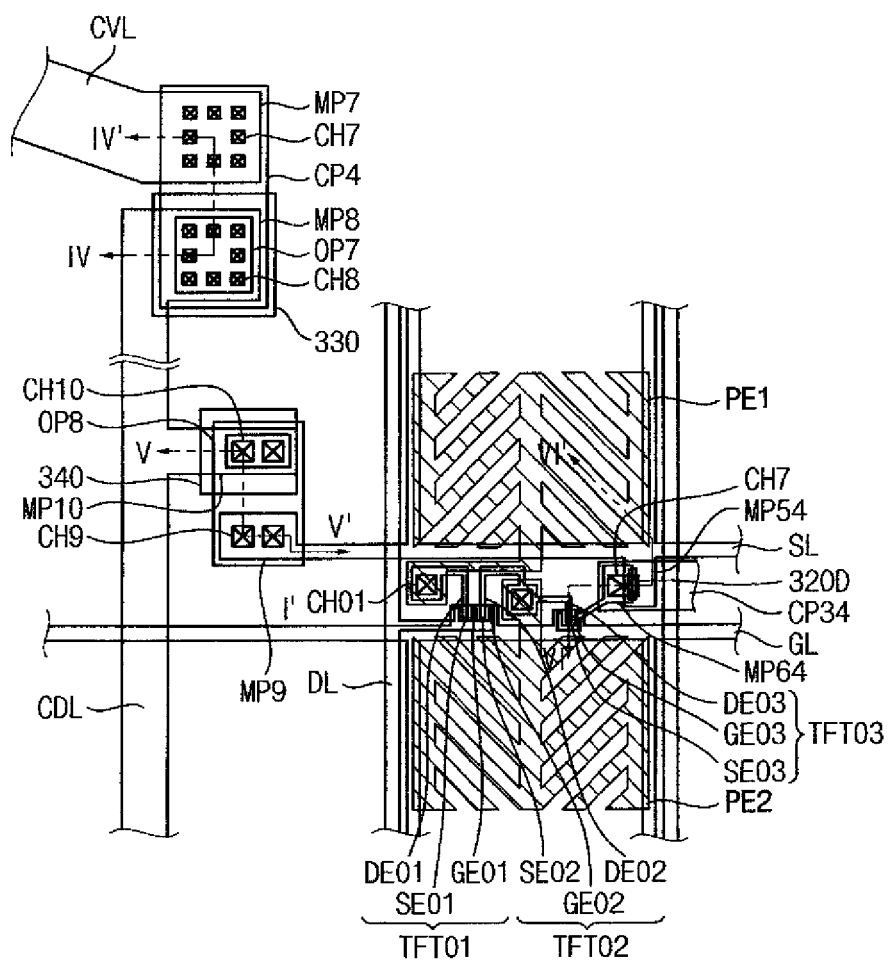
FIG. 15 is a plan view illustrating a display area and a peripheral area of an array substrate according to an exemplary embodiment of the present invention.
Figure 16:
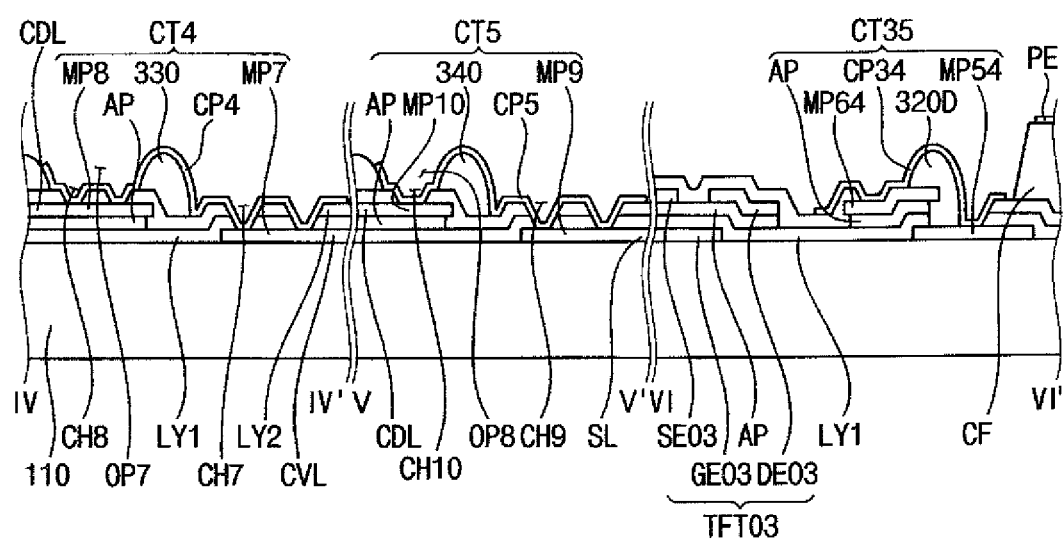
FIG. 16 is a cross-sectional view taken along a line IV-IV' and a line V-V' of FIG. 15.

FIG. 15 is a plan view illustrating a display area and a peripheral area of an array substrate according to an exemplary embodiment of the present invention. FIG. 16 is a cross-sectional view taken along a line IV-IV' and a line V-V' of FIG. 15.

A display substrate according to an exemplary embodiment is the same or substantially the same as the display substrate described in connection with FIG. 11 except for fourth contact part, fifth contact part, and sixth contact part.

Referring to FIG. 15 and FIG. 16, a fourth contact part CT4 in a peripheral area PA of a base substrate 110 transfers a common voltage outputted from a common voltage line CVL to a common voltage distribution line CDL in the peripheral area PA of the base substrate 110. The fourth contact part CT4 includes a seventh metal pattern MP7, an eighth metal pattern MP8, an active pattern AP, a first insulating layer LY1, a fourth connecting pattern CP4 and a fourth disconnection control pattern 330.

The seventh metal pattern MP7 extends from the common voltage line CVL and includes a gate metal. The eighth metal pattern MP8 extends from the common voltage distribution line CDL and includes a data metal. The eighth metal pattern MP8 is disposed on a layer different from the seventh metal pattern MP7 by the first insulating layer LY1, and is spaced apart from the seventh metal pattern MP7.

The fourth connecting pattern CP4 electrically connects the seventh metal pattern MP7 with the eighth metal pattern MP8 through seven and eighth contact holes CH7 and CH8. The fourth connecting pattern CP4 includes a transparent metal.

The fourth disconnection control pattern 330 is formed over the eighth metal pattern MP8 and covers an upper surface of the eighth metal pattern MP8 and a side surface of the eighth metal pattern MP8. The fourth disconnection control pattern 330 covers a side surface of the active pattern AP.

The fourth disconnection control pattern 330 includes a material the same or substantially the same as a color filter pattern CF of the pixel part P. For example, according to an embodiment, the fourth disconnection control pattern 400 includes a material the same or substantially the same as a blue color filter pattern.

The fourth disconnection control pattern 330 includes a seventh opening OP7 exposing the eighth metal pattern MP8 through the eighth contact hole CH8. The opening part OP7 has a width smaller than a width of the eighth metal pattern MP8.

The fourth connecting pattern CP4 extends from the seventh metal pattern MP7 exposed through the seventh contact hole CH7 to the fourth disconnection control pattern 330 between the eight metal pattern MP8 and the fifth contact part CT5 via the fourth disconnection control pattern 330 between the seven metal pattern MP7 and the eighth metal pattern MP8 and via the eighth metal pattern MP8 exposed through the eighth contact hole CH8.

The fourth disconnection control pattern 330 may allow the fourth connecting pattern CP4 to connect the seventh metal pattern MP7 with the eighth metal pattern MP8 without being disconnected even when an under-cut occurs between the eighth metal pattern MP8 and the active pattern AP.

The fifth contact part CT5 in the peripheral area PA of the base substrate 110 transfers a common voltage outputted from the common voltage distribution line CDL to a storage line SL in the display area DA of the base substrate 110. The fifth contact part CT5 includes a ninth metal pattern MP9, a tenth metal pattern MP10, an active pattern AP, a first insulating layer LY1, a fifth connecting pattern CP5 and a fifth disconnection control pattern 340.

The ninth metal pattern. MP9 extends from the storage line SL and includes the gate metal. The tenth metal pattern. MP10 extends from the common voltage distribution line CDL and includes a data metal. The tenth metal pattern MP10 is spaced apart from the ninth metal pattern MP9. The fifth connecting pattern CP5 electrically connects the ninth metal pattern MP9 with the tenth metal pattern MP10 through ninth and tenth contact holes CH9 and CH10.

The fifth disconnection control pattern 340 includes an eighth opening part OPS exposing the tenth metal pattern MP10 through the tenth contact hole 10.

The sixth contact part CT35 in the display area DA of the base substrate 110 is the same or substantially the same as the third contact part CT34 described in connection with FIG. 13 except for further including an active pattern AP.

The active pattern AP and first insulating layer LY1 are disposed under the sixth metal pattern MP64. The active pattern AP and first insulating layer LY1 are etched further than the sixth metal pattern MP64 when the fifth contact hole CH5 is formed, so that an under-cut may be formed between the sixth metal pattern MP64 and the active pattern AP.

According to an exemplary embodiment, the fourth and fifth disconnection control patterns 330 and 340 include a material the same or substantially same as the color filter pattern CF. According to an embodiment, the fourth and fifth disconnection control patterns include a material the same or substantially the same as an organic film.

According to an embodiment, the fourth and fifth disconnection control patterns 330 and 340 include a material the same or substantially the same as a light blocking pattern.

According to an exemplary embodiment, the fourth and fifth contact parts CT4 and CT5 have a shape the same or substantially the same as the first and second contact parts described in connection with FIG. 1. According to an embodiment, the fourth and fifth contact parts CT4 and CT5 have a shape the same or substantially the same as the first and second contact parts described in connection with FIG. 6, FIG. 8 and FIG. 11.

According to an exemplary embodiment, the fourth and fifth contact parts CT4 and CT5 respectively include the fourth and fifth disconnection control pattern 330 and 340, so that the disconnection of each of the fourth and fifth connecting pattern CP4 and C5 may be prevented.

According to the embodiments of the present invention, a contact part includes a disconnection control pattern, so that a connecting pattern electrically connecting a data pattern with a gate pattern may be prevented from being disconnected. Thus, the reliability of a display substrate may be improved.

When the display substrate includes a color filter pattern, the disconnection control pattern includes a material the same or substantially the same as the color filter pattern.

When the display substrate includes a light blocking pattern, the disconnection control pattern includes a material the same or substantially the same as the light blocking pattern.

When the display substrate includes an organic layer, the disconnection control pattern includes a material the same or substantially the same as the organic layer.

As a consequence, an under-cut due to an active pattern or a first insulating layer under the data pattern may be prevented from occurring without additional processes or costs.

A gate pattern of each of first, second and third contact parts overlaps a data pattern of each of the first, second and third contact parts, so that sizes of the first, second and third contact parts may be reduced.

As a consequence, a size of a peripheral area may be reduced, or an aperture ratio of a display area may be increased.

The foregoing is illustrative of the embodiments of the present invention and is not to be construed as limiting thereof. Although a few exemplary embodiments of the present invention have been described, those skilled in the art will readily appreciate that many modifications are possible in the exemplary embodiments. Accordingly, all such modifications are intended to be included within the scope of the embodiments of the present invention as defined in the claims.

What is claimed is:

1. An array substrate comprising;
a base substrate;
a contact part on the base substrate, the contact part including a first metal pattern, a second metal pattern, a disconnection control pattern and a connecting pattern, wherein the second metal pattern is disposed on a layer different from the first metal pattern, wherein the disconnection control pattern overlaps a side surface of the second metal pattern, wherein the connecting pattern is formed on the first and second metal patterns and the disconnection control pattern and connects the first metal pattern with the second metal pattern, and wherein the base substrate includes a display area and a peripheral area surrounding the display area, wherein the array substrate further comprises a pixel electrode in the display area;
a data line connected to the pixel electrode and disposed in the display area; and
a fan-out line connected to the data line and disposed in the peripheral area,
wherein the contact part is disposed in the peripheral area, the first metal pattern extends from the fan-out line, and the second metal pattern extends from the data line.

2. The array substrate of claim 1, further comprising:
a first insulating, laser on the first metal pattern; and
an active pattern under the second metal pattern,
wherein he second metal pattern and the active pattern are spaced apart front the first metal pattern, and wherein the disconnection control pattern overlaps an upper surface and a side surface of an end portion of the second metal pattern.

3. The array substrate of claim 2, further comprising a second insulating layer on the second metal pattern,
wherein the disconnection control pattern is disposed on the second insulating layer overlapping an upper surface and a side surface of an end portion of the second metal pattern.

4. The array substrate of claim 1, further comprising a color filter pattern overlapping the pixel electrode, wherein the disconnection control pattern includes a material the same or substantially the same as the color filter pattern.

5. The array substrate of claim 1, further comprising:
a color filter pattern overlapping the pixel electrode; and
a light blocking pattern between color filter patterns adjacent to each other, wherein the disconnection control pattern includes a material the same or substantially the same as the light blocking pattern.

6. The array substrate of claim 1, further comprising an organic film under the pixel electrode,
wherein the disconnection control pattern includes a material the same substantially the same as the organic film.

7. The array substrate of claim 1, further comprising a circuit transistor on the peripheral area,
wherein the contact part is disposed in the peripheral area,
wherein the second metal pattern extends from a drain electrode of the circuit transistor, and wherein
the first metal pattern extends front a gate line connected to the pixel electrode.

8. An array substrate, comprising:
a base substrate;
a contact part on the base substrate, the contact part including a first metal pattern, a second metal pattern, a disconnection control pattern and a connecting pattern,
wherein the second metal pattern is disposed on a layer different from the first metal pattern, wherein the disconnection control pattern overlaps a side surface of the second metal pattern, wherein the connecting pattern is formed on the first and second metal patterns and the disconnection control pattern and connects the first metal pattern with the second metal pattern;
a first insulating layer on the first pattern;
an active pattern under the second metal pattern,
wherein the second metal pattern and the active pattern are spaced apart from the first metal pattern, and wherein the disconnection control pattern overlaps an upper surface and a side surface of an end portion of the second metal pattern; and
a second insulating layer on the second metal pattern,
wherein the disconnection control pattern is disposed on the second insulating layer overlapping an upper surface and a side surface of an end portion of the second metal pattern, wherein the base substrate includes a display area and a peripheral area surrounding the display area, wherein the array substrate further comprises:
- a gate line extending in a first direction in the display area;
- a storage line spaced apart from the gate line;
- first, second and third pixel transistors connected to the gate line;
- a first pixel electrode connected to the first pixel transistor; and
- a second pixel electrode connected to the second and third pixel transistors, wherein the first metal pattern extends from the storage line, and the second metal pattern is connected to one of the second and third pixel transistors.

9. The array substrate of claim 1, wherein the disconnection control pattern overlaps an edge of an upper surface of the first metal pattern.

10. The array substrate of claim 9, further comprising a first insulating layer on the first metal pattern, wherein a side surface of the first insulating layer is exposed through a contact hole through which the first and second metal patterns are exposed, wherein the second metal pattern overlaps part of the first metal pattern, and wherein the disconnection control pattern overlaps an upper surface and a side surface of an end portion of the second metal pattern and overlaps a side surface of the first insulating layer.

11. The array substrate of claim 10, further comprising an active pattern under the second metal pattern, wherein a side surface of the active pattern is exposed through a contact hole through which the first and second metal patterns are exposed, and wherein the disconnection control pattern overlaps a side surface of the active pattern.

* * * * *